(12) United States Patent
Wilson et al.

(10) Patent No.: US 10,835,834 B2
(45) Date of Patent: Nov. 17, 2020

(54) COASTER AND TROLLEY SYSTEM AND METHOD

(71) Applicant: HIGH VELOCITY DESIGNS, LLC, Newcastle, CA (US)

(72) Inventors: Jeffrey Dean Wilson, Newcastle, CA (US); Christopher Ryan Resnicke, Lincoln, CA (US)

(73) Assignee: HIGH VELOCITY DESIGNS, LLC, Newcastle, CA (US)

( * ) Notice: Subject to any disclaimer, the term of this patent is extended or adjusted under 35 U.S.C. 154(b) by 470 days.

(21) Appl. No.: 15/808,750

(22) Filed: Nov. 9, 2017

(65) Prior Publication Data

US 2018/0126287 A1 May 10, 2018

Related U.S. Application Data

(60) Provisional application No. 62/420,445, filed on Nov. 10, 2016, provisional application No. 62/515,387, filed on Jun. 5, 2017.

(51) Int. Cl.
| | |
|---|---|
| *A63G 7/00* | (2006.01) |
| *B61B 3/00* | (2006.01) |
| *H02K 49/04* | (2006.01) |
| *H02K 49/10* | (2006.01) |
| *B61H 9/00* | (2006.01) |
| *F16D 63/00* | (2006.01) |
| *B61H 9/02* | (2006.01) |
| *A63G 21/20* | (2006.01) |
| *A61B 5/00* | (2006.01) |

(Continued)

(52) U.S. Cl.
CPC ............... *A63G 7/00* (2013.01); *A63G 21/20* (2013.01); *B61B 3/00* (2013.01); *B61B 5/00* (2013.01); *B61H 9/00* (2013.01); *B61H 9/02* (2013.01); *F16D 63/008* (2013.01); *H02K 49/04* (2013.01); *H02K 49/046* (2013.01); *H02K 49/10* (2013.01); *E01B 25/24* (2013.01)

(58) Field of Classification Search
CPC . A63G 7/00; A63G 21/20; B61B 5/00; B61H 9/00; B61H 9/02; H02K 49/04; H02K 49/046; H02K 49/10; E01B 25/24
See application file for complete search history.

(56) References Cited

U.S. PATENT DOCUMENTS

| | | |
|---|---|---|
| 3,949,679 A | 4/1976 | Barber |
| 4,069,765 A | 1/1978 | Muller |
| 4,223,495 A | 9/1980 | Peter |

(Continued)

*Primary Examiner* — Jason C Smith
(74) *Attorney, Agent, or Firm* — Pate Baird, PLLC

(57) ABSTRACT

A rail coaster operates as a cross between a roller coaster and a zip line. A rail may be suspended under a frame by flexible cables or solid brackets. The rail may turn, incline, decline, or twist, but need not twist to still provide a "rolling" degree of freedom for a rider. An eddy current brake provides proportional braking as a function of speed. A cam-adjustment-axle (eccentric) carries certain wheels to provide finely divided, discrete, but incrementally small adjustments of idler wheel clearances to accommodate variations in the rail, wheel wear, and onsite adjustment of tolerances for curvature, unevenness, and friction. A "static universal" bracket provides adjustment in four degrees of freedom, three of translation and one of rotation in securing a rail to a supporting frame.

19 Claims, 26 Drawing Sheets

(51) Int. Cl.
  *E01B 25/24* (2006.01)
  *B61B 5/00* (2006.01)

(56) References Cited

U.S. PATENT DOCUMENTS

| | | | |
|---|---|---|---|
| 4,457,035 A | 7/1984 | Habegger et al. | |
| 4,757,650 A | 7/1988 | Berger | |
| 4,865,550 A | 9/1989 | Chu | |
| 5,060,332 A | 10/1991 | Webster | |
| 5,433,153 A | 7/1995 | Yamada | |
| 5,513,408 A | 7/1996 | Minakami et al. | |
| 5,853,331 A | 12/1998 | Ishikawa et al. | |
| 6,170,402 B1* | 1/2001 | Rude | A63G 7/00 |
| | | | 104/53 |
| 6,666,773 B1* | 12/2003 | Richardson | F16D 63/008 |
| | | | 472/49 |
| 7,066,822 B2 | 6/2006 | Cochron | |
| 7,802,523 B2* | 9/2010 | Moritzhuber | B61B 7/00 |
| | | | 104/173.1 |
| 8,522,689 B2* | 9/2013 | Beck | B61B 12/105 |
| | | | 104/112 |
| 10,478,737 B2* | 11/2019 | Liggett | B61B 3/00 |
| 2003/0066453 A1 | 4/2003 | Cylvick | |
| 2006/0137563 A1* | 6/2006 | Cummins | A63G 21/20 |
| | | | 104/53 |
| 2006/0288901 A1 | 12/2006 | Cylvick | |
| 2008/0229967 A1* | 9/2008 | Lins | B61B 3/00 |
| | | | 104/173.1 |
| 2009/0078148 A1* | 3/2009 | Cylvick | A63G 7/00 |
| | | | 104/53 |
| 2011/0239895 A1* | 10/2011 | Liggett | B61B 7/00 |
| | | | 104/113 |
| 2012/0067246 A1* | 3/2012 | Liggett | B61B 12/00 |
| | | | 104/89 |
| 2013/0228092 A1* | 9/2013 | Liggett | A63B 9/00 |
| | | | 104/140 |
| 2015/0217783 A1* | 8/2015 | Horihan | A63G 21/22 |
| | | | 104/113 |

* cited by examiner

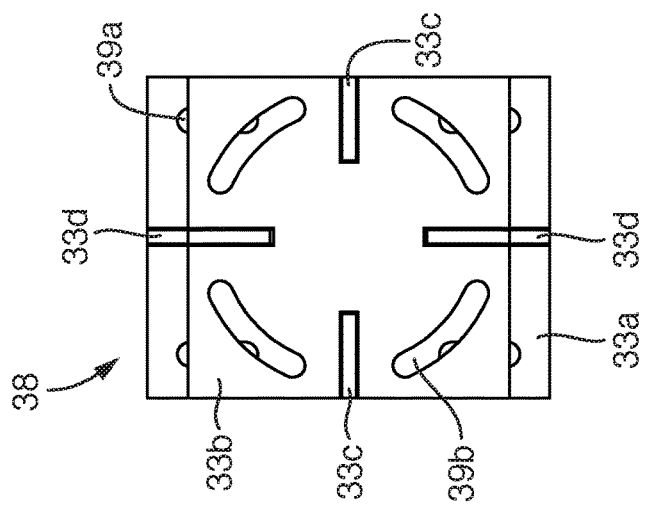
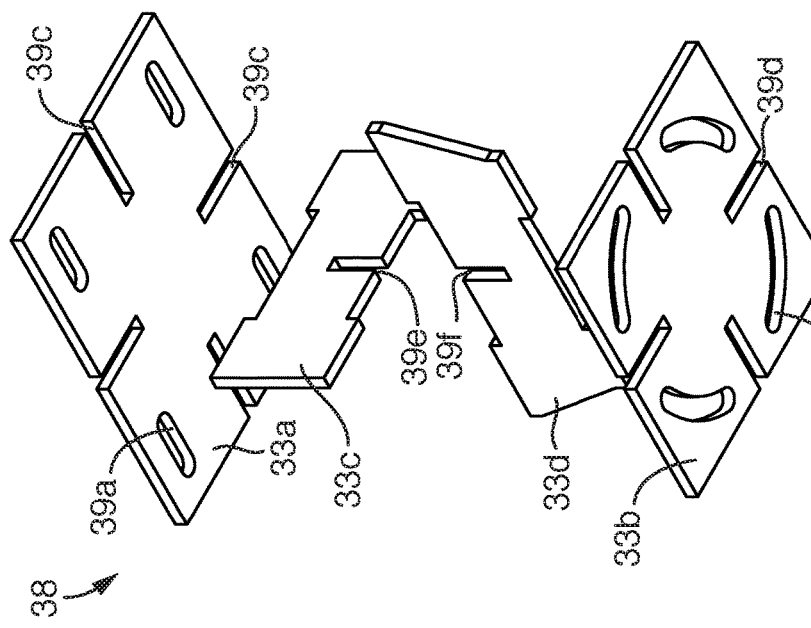
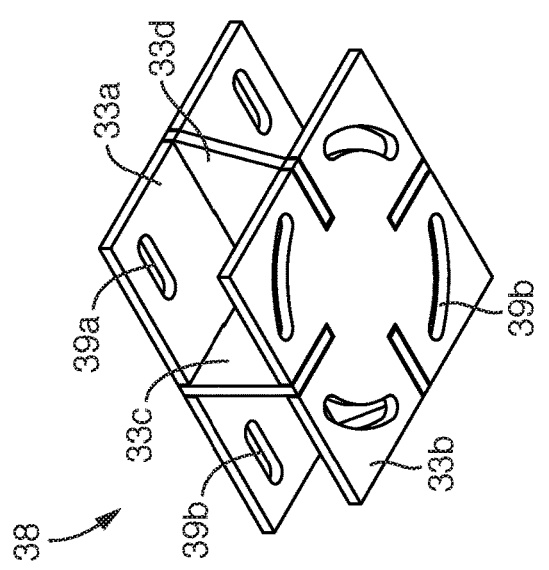
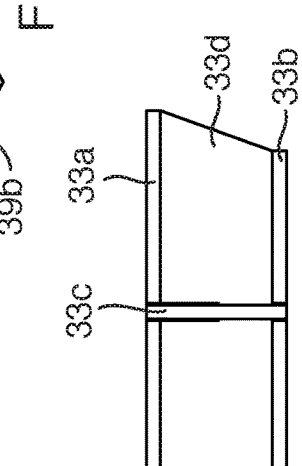
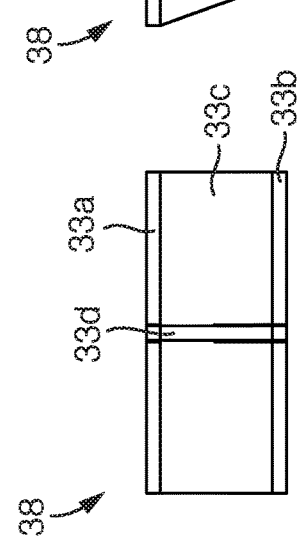

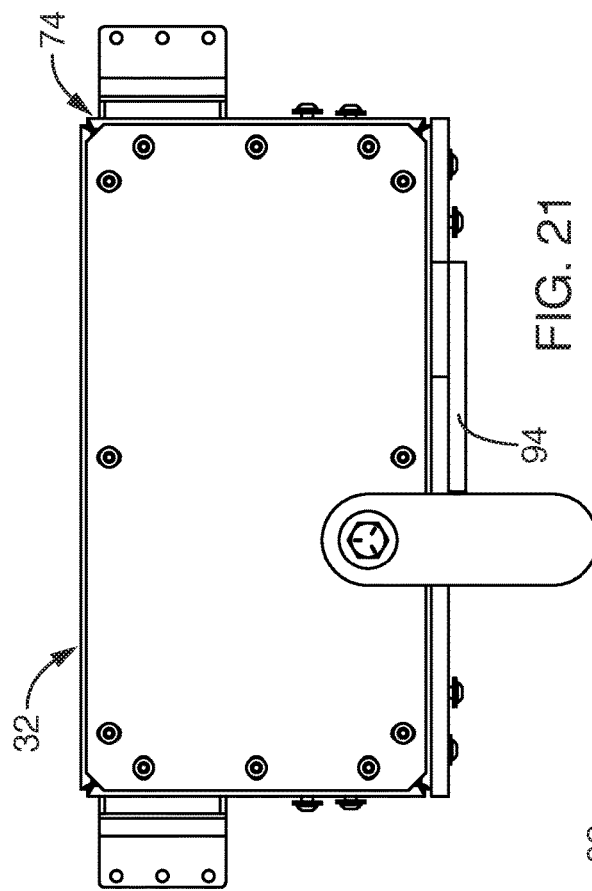
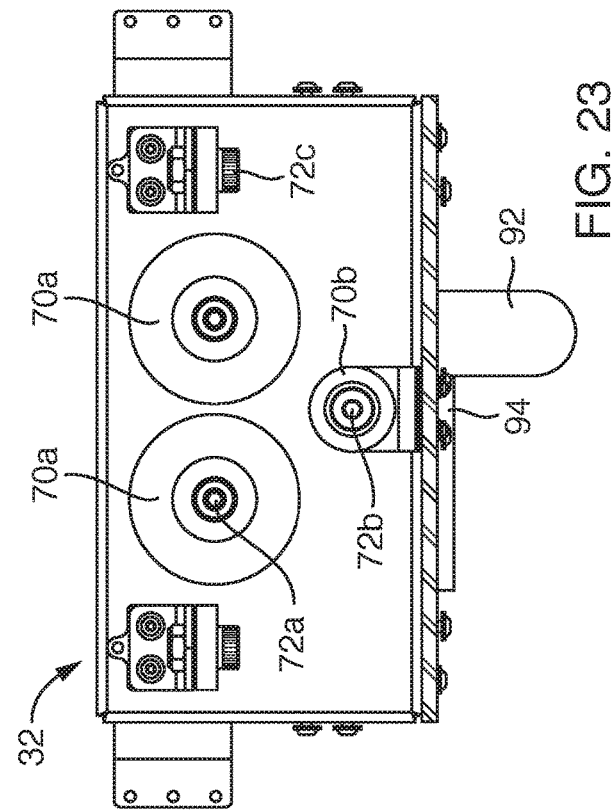
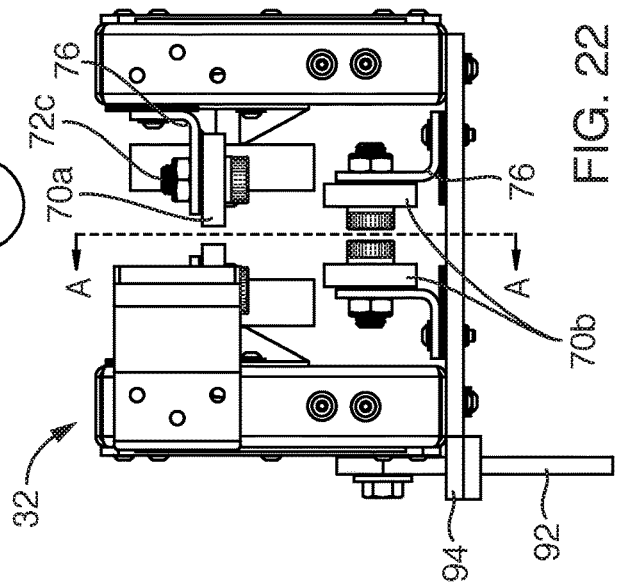

| Control for adjustment and number of holes in tab | | | |
|---|---|---|---|
| | input output | | |
| Name | Symbol | Value | |
| Adjustment | θ | 0.25 | |
| Number of holes in tab | n | 3 | |
| Panel | θ | 0.75 | |
| Tab | θ | 0.5 | |

$$\frac{\theta_{tab}}{\theta_{panel}} = \frac{n-1}{n} \quad \text{(EQN1)}$$

$$\theta_{panel} - \theta_{tab} = \theta_{adjust} \quad \text{(EQN2)}$$

Simplifies into:

$$\theta_{panel} = n\theta_{adjust} \quad \text{(EQN3)}$$

$$\theta_{tab} = (n-1)\theta_{adjust} \quad \text{(EQN4)}$$

| Control for the spacing of panel and hole tabs | | | |
|---|---|---|---|
| | input output | | |
| Name | Symbol | Value | |
| Panel | θ | 31.25224 | |
| Tab | θ | 20.83483 | |
| Adjustment | θ | 10.41741 | |
| Number of holes in tab | n | 3.00000 | |

$$\frac{\theta_{tab}}{\theta_{panel}} = \frac{n-1}{n} \quad \text{(EQN1)}$$

$$\theta_{panel} - \theta_{tab} = \theta_{adjust} \quad \text{(EQN2)}$$

Simplifies into:

$$\theta_{adjust} = \theta_{panel} - \theta_{tab} \quad \text{(EQN5)}$$

$$n = \frac{\theta_{panel}}{\theta_{panel} - \theta_{tab}} \quad \text{(EQN6)}$$

FIG. 36

$$F_{braking} = pc_s v \quad \text{(EQN7)}$$

$$c_s = -asd_1 B_s^2 lw C_{convert} \quad \text{(EQN8)}$$

$$a = 1 - \frac{1}{2\pi}\left[4\tan^{-1}\left(\frac{l}{w}\right) + \frac{l}{w}\ln\left(1 + \frac{w^2}{l^2}\right) - \frac{w}{l}\ln\left(1 + \frac{l^2}{w^2}\right)\right] \quad \text{(EQN9)}$$

$$B_s = \frac{B_r}{\pi}\left[\tan^{-1}\left(\frac{lw}{2z\sqrt{4z^2 + l^2 + w^2}}\right) - \tan^{-1}\left(\frac{lw}{2(D+z)\sqrt{4(D+z)^2 + l^2 + w^2}}\right)\right] \quad \text{(EQN10)}$$

FIG. 37

COASTER AND TROLLEY SYSTEM AND METHOD

1. RELATED APPLICATION

This application claims the benefit of U.S. Provisional Patent Application Ser. No. 62/420,445, filed Nov. 10, 2016 and claims the benefit of U.S. Provisional Patent Application Ser. No. 62/515,387, filed Jun. 5, 2017, both of which are hereby incorporated by references in their entireties including all Figures and Appendices pertaining thereto.

2. THE FIELD OF THE INVENTION

This invention relates to amusement rides, and more particularly, roller coaster types of rides.

3. BACKGROUND

Amusement rides come in many forms and designs. Carousels have existed for many years. The Ferris Wheel debuted at a World's Fair in Chicago, where it lifted people high into the air in seats as gondolas that pivoted to maintain their orientation as the wheel itself rotated on an axle. A seemingly endless series of rides has been subsequently installed at amusement parks and carnivals. Many rely on a car that moves in relative motion with respect to a deck, support pillar, track, or the like.

Notably, electric motors or internal combustion engines may rotate arms on which cars or gondolas are connected to move in simple or complex relative motions, including rotation, translation, both, or multiple combinations of either or both. Meanwhile, coasters have developed as train-like devices in which several cars are connected to a pair of rails arranged as a track. They rise to a maximum height and then descend in undulating motion, rising and descending over and over as the potential energy of altitude is repeatedly converted to kinetic energy and recovered as potential energy. The cars rise and slow down, then drop and speed up, repeating until friction and drag consume all the momentum. Various twists and turns may be engineered into the track controlling the motion of cars.

More recently, large systems of rails have been constructed with more complex turns, loops, inversions, and support systems to render those motions possible. Coasters are colossal in height and tortuous in traverse. Also, unique support schemes have been developed. For example, U.S. patent application Ser. No. 12/238,245 (Pub. No. US 2009/0078148) filed on Sep. 25, 2008 and entitled SUSPENDED COASTER RAIL APPARATUS AND METHOD is hereby incorporated herein by reference in its entirety.

BRIEF SUMMARY OF THE INVENTION

In view of the foregoing, in accordance with the invention as embodied and broadly described herein, a method and apparatus are disclosed in one embodiment of the present invention as including, in certain embodiments, a coaster system with adjustable wheel assemblies, eddy current braking, a static universal joint for easily aligning track with supporting structures thereabove, and more degrees of freedom for a rider that need be engineered into the track and trolley.

For example, adjustable wheel assemblies may use a cam-type of axle that is mounted eccentrically by a bolt and a set screw. The bolt serves as an internal axle on which the main axle bears. Accordingly, the main axle that carries the wheel may be rotated eccentrically about the bolt or camming axle mounted to the frame or a bracket connected to the frame.

Accordingly, with a set screw that extends parallel to the mounting bolt (mounting or camming axle), the wheel main axle may be rotated eccentrically to move closer or farther from the contact surface against which the wheel or roller rides. Accordingly, the wheel or roller may be adjusted in its distance from that contact surface on the track. The wheel may be stabilized by fixing the wheel axle against the frame or bracket by threading the set screw inward through it, extending parallel to the bolt and stopping against a frame or bracket to which it is secured.

Each side (laterally, left and right), considering the front or end of a trolley to be the portion facing in the direction of travel, will carry magnets. Those magnets are mounted on a ferrous metal bracket (a magnetic flux guide) extending in the direction of travel along each side of the frame. These brackets may be adjusted up and down in order to modulate the vertical extent of engagement of the magnets contained thereon with an eddy current plate extending in the direction of travel and made up of ferrous and non-ferrous, but electrically conducting in every event, metal.

By adjusting the height of engagement (vertical overlap) therebetween, one may adjust the engagement of the electromagnetic magnets with the eddy current plate fixed with respect to the track and permitting the trolley to pass therethrough subject to a resistance force. Accordingly, the amount of eddy current generation due to the "Lorenz effect," and therefore the amount of mechanical resistance for braking, may be adjusted (changed, modulated).

A tow shaft or engagement arm may extend from a lift trolley to engage a rider trolley, or vice versa. Likewise, various axles are created with pins or bolts. Axles have keepers, such as cotter keys or cotter pins as they are conventionally called extending normal (perpendicular) to the axial direction of each carrier pin or axle. Accordingly, these cotter pins may be easily inserted and removed as required to keep or release the axle pins. Alternatively, or in addition, axles may be bolts secured by nuts protected by Jam nuts, cotter pins, or friction elements against disassembly.

In one embodiment, a trolley in accordance with the invention may feature a damper operating similarly to a shock absorber extending from a lower rider support frame (yoke assembly) and connecting to the upper track riding (trolley frame) portion. The lower rider carrier (yoke assembly) portion may pivot on an axle, such as an axle extending longitudinally (in the front-to-back direction) along the length of the trolley. This axle may permit side-to-side (lateral) swinging or pivoting of the suspended harness (seat, webbing structure) and rider therebelow.

Nevertheless, in order to dampen or ameliorate this side-to-side (lateral) swinging, a damper (viscous liquid forced through an aperture by a piston) or shock absorber may connect between the trolley portion that is the track rider and the lower yoke assembly that acts as a rider support for slings and webbing (seat) the person sitting in the harness. Accordingly, side-to-side swinging is dampened. Also, the faster this lateral (side) motion operates, the more force is engaged in a viscous.

In one currently contemplated embodiment, a spreader bar or end plate of the yoke assembly may extend across each end of the trolley to maintain the distance apart of supporting slings that carry the harness or chair in which a rider reposes. In one contemplated embodiment, apertures are provided proximate each end thereof extending laterally away from the track. The apertures may receive carabiners or other connectors to suspend the slings, straps, webbing, harness, seat, or a combination thereof suspending therebelow. One of these end plates, hanger brackets, or spreader bars is positioned proximate the front of the trolley. Another is located proximate the rear of the trolley. With a seat or harness having three or four vertical slings connected to the yoke assembly, fore-to-aft pendulum motion is virtually eliminated. Swinging due to accelerations and decelerations may likewise be ameliorated or otherwise minimized for rider comfort and safety.

In certain embodiments of a trolley in accordance with the invention, the frame represents an assembly of components fixed with respect to one another to operate in solid or rigid-body motion. That is, the frame represents a substantially solid or rigid body in motion along the track. However, the yoke assembly (harness carrier) may operate in substantially rigid body motion fore-to-aft and up and down with respect to the frame, while yet being able to freely swing laterally (side-to-side). The track thus becomes a reference path along which the trolley operates under the influence of momentum and gravity. A rider in a seat moves with the trolley forward and vertically up and down. However, a rider pivots with the yoke assembly in a "roll" direction on turns.

In certain embodiments, a chain, such as a sprocket chain may operate along a lift rail connected to be rigidly parallel to a portion of the main carrier track. The chain has one link or more modified to contain an engagement member to engage a lift trolley, which then lifts the rider or carrier trolley. A lift trolley may be moved forward and upward, lifting the main carrier trolley, then return. Alternatively, as an engagement arm or member on the chain passes a lift trolley, an engagement member on the lift trolley may engage the engagement arm or member of the chain.

Whether the link of the chain is temporarily or permanently fixed to the lift trolley, the lift trolley contains an engagement arm to engage a corresponding engagement arm on the carrier trolley to carry a rider on the main carrier trolley up an incline to begin coasting down. Accordingly, the chain engages the lift trolley, and the lift trolley engages a carrier trolley.

At some point past the top of a ramp portion of the carrier track, the lift track may diverge from the carrier track, thus disengaging very simply and straightforwardly, and especially reliably, from the carrier trolley. The carrier trolley is then free to descend under the influence of gravity as a coaster along the carrier track. The lift trolley may reverse direction with the chain and return to its starting location or move there on a continuous loop of chain.

The engagement arm on the chain may be a bracket that is manufactured in, as, or on a modified link in the chain. Thus, the chain may operate continuously in a single direction tending to lift. In the presence of a lift trolley, may engage and operate to draw the lift trolley up to and along the ramp area in which the lift track parallels the carrier track. Accordingly, the lift trolley is engaged by the chain as a source of power, and itself then engages the carrier trolley to lift a rider up the ramp portion of the carrier track.

One benefit of an integral pickup or engagement arm on a chain is the relieving of an operator from having to pay attention to starting and stopping or engaging and disengaging a chain, a lift trolley, or the like. Instead, the presence of a lift trolley simply operates automatically. A lift trolley may simply be engaged automatically when it is present.

Magnets are set in an array extending in length in an axial (longitudinal, travel) direction. They have width in a vertical or transverse direction, and may stack in a lateral (side) direction. They will be mounted on a ferrous material as the bracket that secures them to the trolley. This tends to improve the operation of the magnets by acting as a flux guide.

A magnet array may be established at location and have a particular length, along the direction of travel, in order to provide the amount of spatial engagement (overlap), the amount of eddy current braking available, and so forth. Likewise, the magnets may be spread out over any greater or lesser length and may be distributed along a greater or lesser height along their bracket that holds them.

Similarly, magnets may be stacked to increase the magnetic flux therethrough. Stacking would effectively stack the magnets to extend farther in a lateral direction. A longitudinal or axial direction along the track is the direction of motion of a trolley carrying the rider. Laterally means left or right, and transverse is vertical, the three directions being orthogonal.

The magnets may extend in a longitudinal or axial direction as a strip of magnets on a bracket on each side of a carrier trolley. They may extend laterally in stacking, vertically in width, as well as adding along their longitudinal extent. All of these extents to which magnets may be laid out and supported on the bracket may be used to control engagement and force provided by eddy current braking.

In some embodiments, a trolley may include various eyes, apertures, or the like in order to provide a connection point to move a trolley along a track. For example, one may choose to lift vertically, by a lift eye-bolt, a trolley to mount it on the track or to draw it longitudinally from a storage location thereon to an active track. Meanwhile, an eye-bolt or an eye-shaped carrier for a bearing may operate to support the front-to-rear axle of the harness bracket suspended below the carrier trolley.

In short, the trolley contains everything required for carrying a rider, and operates to contain its own braking built into it. Meanwhile, a lift track that extends up parallel to a ramp portion of the carrier track contains everything required to lift the carrier trolley supporting a rider. Similarly, the carrier trolley under which the rider is suspended in a harness or seat has the ability to decelerate itself as it passes by eddy current plates constituting braking areas at any portion of the track where desired. Braking may be used particularly before sharp or high-speed turns, or near the end of a ride, in order to assure that momentum (mass times velocity) has been decreased to a safe level.

In certain embodiments of an apparatus and method in accordance with the invention, a supporting frame above a track may involve posts or pillars that operate to extend vertically from an underlying supporting surface. Across these base posts or pillars may be affixed lateral beams that extend horizontally. These lateral beams may be considered stringers and may be gusseted at their ends and provided with brackets for securing one component (e.g., length, segment) of track to the next. Accordingly, individual turns, rises, declines, loops, and the like may be made in pieces that may all be connected axially together.

Typically, track may be a lower flange of an I-beam or lower tubes in a truss. The track of tubular members that actually operate as the track may be two lower tubes extending longitudinally in a truss. The supporting top tube may be maintained in cradles that fit the diameter of the tubing. These may clamp around the top tube at various sites, or may be welded thereto in order to secure firmly the top tubing in a truss of a tubular track. The tubular track may be considered "a truss track" inasmuch as multiple tubes, typically one top tube and two bottom tubes may be periodically connected together by struts. Struts spacing them apart and holding them together in a rigid embodiment provide minimum weight and maximum strength and stiffness.

One may think of cradles to support the track as a beak having an upper and lower half, which halves have an inside diameter matched to the outer diameter of a top tube in a truss track. Accordingly, the top tube is maintained within two halves cut lengthwise along the length of their circular cross-sectional tube in order to be bolted together around the top tube of the track, welded, or the like.

To the extent that any particular tube may need to be shaped to have curvature to extend up, down, left, or right as that tube on that track progresses along the path, the beak or support clamp that operates as a cradle may likewise itself be shaped to match.

Meanwhile, a frame or support template may be placed periodically between the upper, and lower, tubes and between the two lower tubes. It provides the exact spacing and increases stiffness in the structure that becomes the truss track.

The supporting stringers or beams, from which cables suspend the track, will typically not be in danger of striking or being struck by the rider. The vertical posts or pillars may need to be carefully spaced in order that a rider swinging wide on the outside of a turn (or returning back inward) does not accidentally strike a supporting pillar. Thus, a pillar closest to the track should typically be located on the inside of a turn.

All track and beam connections may use a double (two-dimensional) shear design (e.g., vertical and horizontal) in order to increase the rigidity and durability of the track and its supports. Accordingly, as illustrated, end plates extend along the ends perpendicular (normal) to the direction of travel and the direction of progress along any track. Likewise, in some embodiments a horizontal and a vertical plate are either formed (e.g., angle iron), bent, or welded together in order to provide full shear support normal to the axial direction on ends of I-beam types of pillars, beams, and tracks, as well as the internal frames in truss tracks. A collar system, typically manufactured in two pieces permits aligning the lower tubes with the top tube quite simply by way of slots formed in the individual halves of the split collar.

Applicant discloses a system and method for use of a coaster and trolley system. The coaster track may be suspended in a manner that allows the rider to feel like they are floating through the ride without the conventional tracks and supporting structure below.

A Lift System may comprise a chain (e.g., sprocket chain) with protrusions. The protrusions can be either bent tabs, or rods off a link. The link may have such features on both the left and right hand side of its outer plates.

The chain may be attached onto a motor by a driving sprocket, and provided with "idler sprockets" to guide and tension it. It may engage the lift trolley or the carrier trolley directly, by contacting a tab or bar extending from a chain link to fit against a swing arm held by a bracket or stop. The link's tab or bar pushes the swing arm of the carrier trolley against the stop bracket, which forces the trolley to move forward along the direction of movement of the chain. This action forces the carrier trolley to climb a ramp. When the climb is complete the ramp may level off and will next descend. The chain link is rotated away either laterally or transversely (down) from its contact position against the bracket. The trolley continues off, past the tangent of the ramp bend and is acted upon by the gravitational field.

The chain can be continuously operated in a loop. The trolley is engaged when it is pushed toward past the link tab or bar, after which the swing arm drops down engaging the link bar or tab. This eliminates the need for any start-stop operation, processing more customers through the ride.

In another embodiment, a lift trolley (or a push trolley) may operate in parallel with (or proximate) a ride trolley. The lift trolley and ride trolley may be on parallel tracks, but other configurations are possible.

The ride (carrier) trolley may suspend a harness for a rider. The ride trolley may travel the entire length of the ride and may be in a circuitous formation of some sort. The ride trolley may engage with the lift trolley in a manner that moves the ride trolley to a designated or desired point along the track.

Generally the ride trolley may stop at a point where riders can be interchanged unloaded and loaded. Then the lift trolley will move the ride trolley up or to a certain portion or position of the track where the ride trolley may continue along a track without further assistance from the lift trolley. In one embodiment, the ride trolley may include a horizontal arm or horizontal beam that is capable of engaging the lift trolley. The ride trolley may move alongside the lift trolley and the horizontal arm of the ride trolley will move or rotate a tab (e.g., ratchet, no-back member) on the lift trolley. The tab may rotate or move in a forward manner.

Once the ride trolley is in front of or beyond the tab, the tab may rotate into a fixed position (or engagement position). Then, the lift trolley may engage the ride trolley by moving forward in a manner where the tab engages the horizontal arm (e.g., simple bar or tube of rectangular or circular cross-section), but now the tab is stopped from rotating back, and the tab pushes the horizontal arm, thus pushing the ride trolley.

Track may have installed beside and spaced away from it a Ferrous-Non Ferrous Brake combination or pair of layers at a specified ratio of 1:2 for up to 0.5" (1.27 cm) thick Non-Ferrous metal. Magnets are packed against each other to create the maximum magnetic flux. Drilled holes within the Non-Ferrous and/or Ferrous metal, may reduce the braking force, allowing modulation. Moveable brackets may allow for adjustment of an "air gap" between the Non-Ferrous plate (current plate) and magnets, adjusting the braking power.

A parallel configuration increases the braking force per length of track. A cam activated braking system may be incorporated by that configuration in the case of chain failure or power outage. Non-adjustable, load-bearing, wheels are fine on the top of the trolley or cart, but an adjustable wheel contact position is best on the bottom and the side rollers.

The rear to front attachments reduce swing of the passengers and a deliberate trolley descent along the track. Applicants have also disclosed a joint for use in the track system. The track joint allows for correction of a tremendous amount of potential for misalignment in the track system for maintaining track integrity. The holes in the joint allow for essentially 360 degree angled misalignment in a horizontal plane parallel to the floor, of the track, as well as an inch or so of misalignment in every other direction. To attach to the track, circular slots in a "static universal bracket" match up with a plate with circular slots fixed on the track. To attach to the support structure, a plate with straight slots (in the "static universal bracket") attaches on a "Support beam assembly" having a plate with slots oriented orthogonally across those in the "universal." The ends of the support beams can be independently adjusted up or down, allowing the structure to even compensate for rotational misalignment.

A method of installation and operation may include providing a course track defining a longitudinal direction, lateral direction, and transverse direction mutually orthogonal to one another at any point along the course track; providing a ride trolley fitted to ride on the course track; providing a lift track; and providing a lift trolley, drive motor, and connection strand such as a chain or belt.

Thereafter, the process may include mounting the ride trolley onto the course track; mounting the lift trolley on the lift track; and engaging the ride trolley by the lift trolley to move both under the influence of the drive motor on the lift trolley through the connection strand. At some point an operator may load a rider into a harness, thus suspending a rider from the ride trolley. The system then moves the rider up a ramp portion of the track, to be released to pass through lateral, transverse, and longitudinal translation with the course track and in roll (about a longitudinal axis) outside the path of the course track about a longitudinal axis.

The method may include braking the trolley by eddy current braking. The braking system may include a magnet secured fixedly to one of the ride trolley and the course track and a current plate spaced away from the magnet on the other of the course track and the trolley. Adjusting the eddy current braking may include adjusting a clearance between the current plate and the magnet or array of magnets stacked in up to three dimensions.

The method may include varying the clearance in a lateral direction with distance along the current plate in a longitudinal direction. This may be done dynamically by varying the clearance based on speed of a trolley approaching engagement of the magnet with the current plate, or based on an input of rider weight measured, sensed, or input by an operator or rider. One may provide control of the clearance empirically based on testing and measuring the effect of a weight of the loaded trolley against the rail. Load may be deadweight or an actual a rider.

A static universal may connect between the track or rail and a mounting location adjustable in four degrees of freedom. Four degrees of freedom for aligning and connecting a bracket on the track to a bracket on the supporting frame system may include three degrees of freedom in translation and one of rotation. In one embodiment, the three degrees of freedom in translation are mutually orthogonal. They may be oriented to vertical with gravity. Two of the degrees of freedom in translation may be provided by apertures elongated orthogonally with respect to one another. A third degree of freedom may be represented and adjusted by a fastener through the crossover location of the orthogonal apertures.

A method may include damping to control a rate of rotation (roll) of a rider in harness suspended from a pivotable yoke assembly suspended from the frame of the trolley, and thus relative motion with respect to the trolley frame and its track rail.

One embodiment of a system consistent with the invention may include an apparatus including a track defining longitudinal, lateral, and transverse directions. A trolley having a frame operable along the track to move longitudinally thereon may include a yoke pivotable with respect to the frame about a longitudinal axis. A harness suspended from the yoke may be capable of moving in translation in three degrees freedom, up and down, right and left, and forward (usually not backward, although possible). A fourth degree of freedom constitutes rotation independent from the translation motions and degrees of freedom.

An eddy current braking system may be constituted by a magnet, fixed with respect to one of the trolley and the track, and a current plate fixed with respect to the other of the track and trolley.

A framing system supporting the track below a framing system of support may connect therebetween by a static universal joint or static universal connector. The "universal" is positionable, between and with respect to the framing system and the track in three degrees of freedom in translation, mutually orthogonal to each other, and in one degree of freedom constituting rotation, to fix the track with respect to the framing system. The four degrees of freedom are for alignment during installation, and are eventually locked down by fasteners to become rigid.

The trolley frame and pivotable yoke suspended therebelow may connect by a bearing system, and also by a damper secured between the frame and the yoke. The damper may be operable to control a pivoting motion of the yoke with respect to the frame, based on a pendulous motion of a rider with respect to the frame while suspended from the yoke. A rider is theoretically a pendulum, but the angle of motion is not the small value required for the pendulum equations and parameters to apply exactly. Also, friction is not insignificant, nor is air drag against a rider and seating harness system.

When an eddy current braking system is used, including a magnet and a current plate interacting between the trolley frame and the track, it may be automatically and dynamically controlled based on rider weight, trolley speed on approaching the current plate, or both. A static setting may be made once for the ride, made once for a rider, or be made dynamically based on sensors detecting speed, weight, or both.

A framing system supporting the track may ease installation by using the static universal positionable between and with respect to the framing system and the track, in three degrees of freedom in translation, mutually orthogonal to each other, and in one degree of freedom constituting rotation, to fix the track with respect to the framing system. A damper operable between the frame and the yoke to control a rolling motion of the yoke and a rider suspended thereby, may be adjusted or tuned to provide a precise control of oscillation or swinging out (roll) based on pendulum characteristics of the trolley, harness seat system, and rider.

A harness suspended from the yoke supports a rider moving in three translational degrees of freedom along the track and mutually orthogonal to one another, and in a rotational degree of freedom with respect to the frame of the trolley.

Where an apparatus as a coaster includes a track, trolley moving longitudinally thereon, and a yoke and frame constituting the trolley, the yoke is best made pivotable with respect to a frame about a longitudinal axis (the direction of travel).

BRIEF DESCRIPTION OF THE DRAWINGS

The foregoing and other objects and features of the present invention will become more fully apparent from the following description and appended claims, taken in conjunction with the accompanying drawings. Appendix A contains all figures referenced herein. Appendix B includes a user's manual, and pictures of the track system, trolley system, harness, and related aspects of the present invention. All appendices are hereby incorporated into this disclosure.

Understanding that these drawings depict only typical embodiments of the invention and are, therefore, not to be considered limiting of its scope, the invention will be described with additional specificity and detail through use of the accompanying drawings in which:

FIG. 6A is a perspective view of one embodiment of a supporting, adjustable coupling for supporting a track in accordance with the invention;

FIG. 6B is a perspective, exploded view thereof, illustrating the components contained therein;

FIG. 7 is a top plan view thereof;

FIG. 8 is a front elevation view thereof;

FIG. 9 is a side elevation view thereof;

FIG. 21 is a side elevation view thereof;

FIG. 22 is an end elevation view thereof;

FIG. 23 is a side elevation, cut away view thereof;

FIG. 25 is a side elevation view thereof, positioned on, and illustrating a portion of, the frame of a trolley;

FIG. 36 is a chart illustrating a method for calculating control for adjustment and number of holes in a tab for an adjustable, eccentric axle on a trolley wheel, and control for the spacing of panel and hole tabs; and FIG. 37 is a system of equations defining eddy current braking in a system in accordance with the invention.

DETAILED DESCRIPTION OF THE PREFERRED EMBODIMENTS

Figure 1:
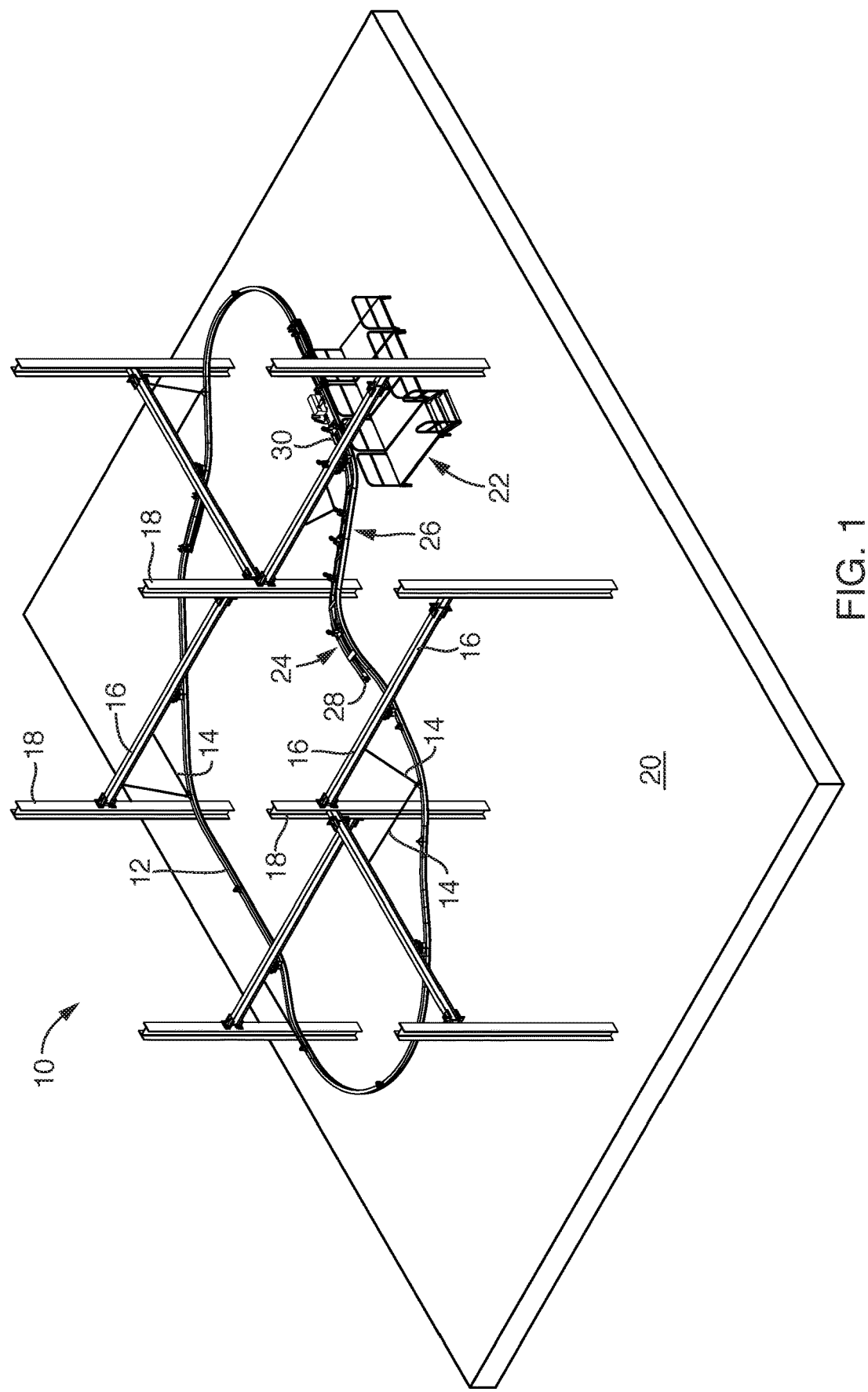
FIG. 1 is a perspective view of one embodiment of a layout for a coaster system in accordance with the invention.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, but is merely representative of various embodiments of structures implementing aspects of the invention. The illustrated embodiments of the invention will be best understood by reference to the drawings, wherein like parts are designated by like numerals throughout.

Figure 2:
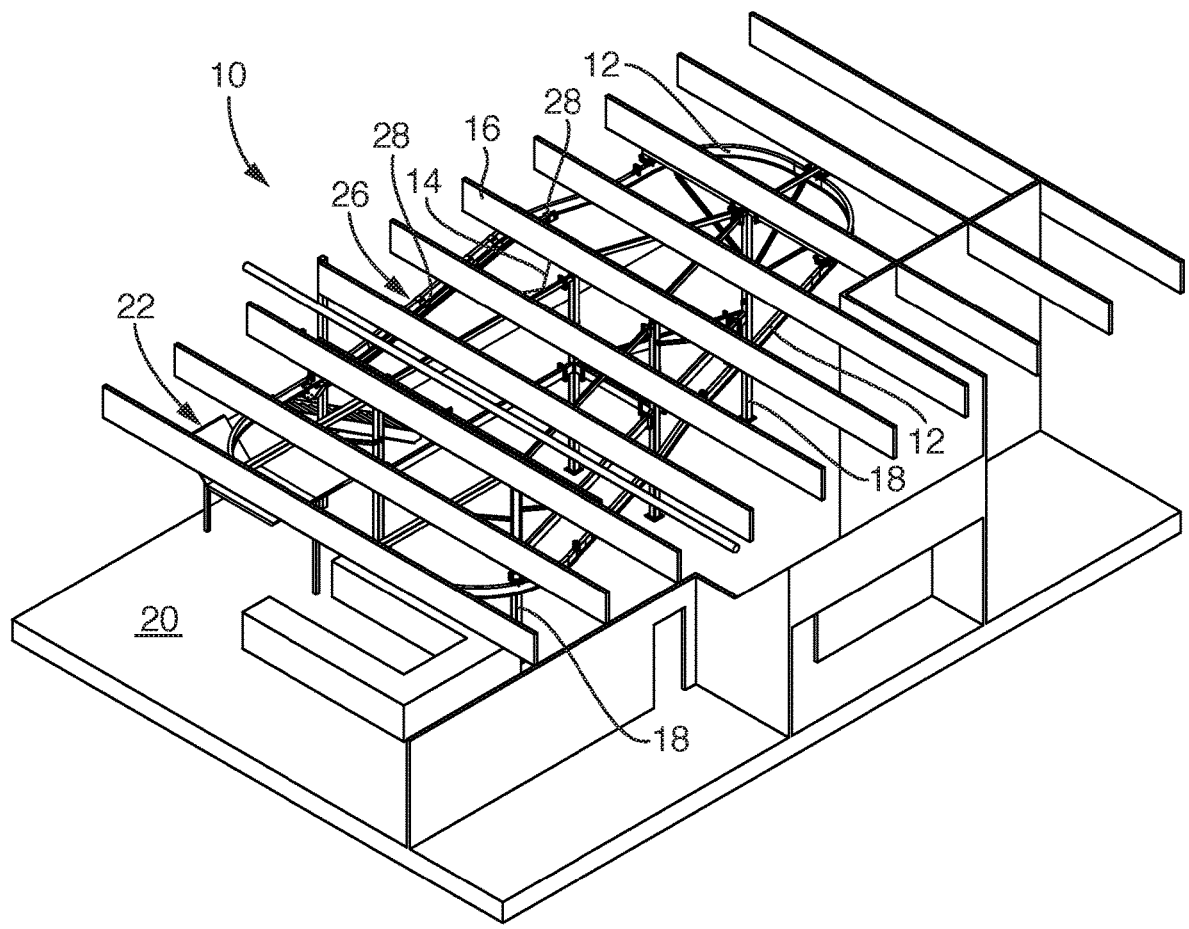
FIG. 2 is a partially cut away view of an alternative embodiment of a coaster system in accordance with the invention inside a building with the supporting overhead beams illustrated.
Figure 3:
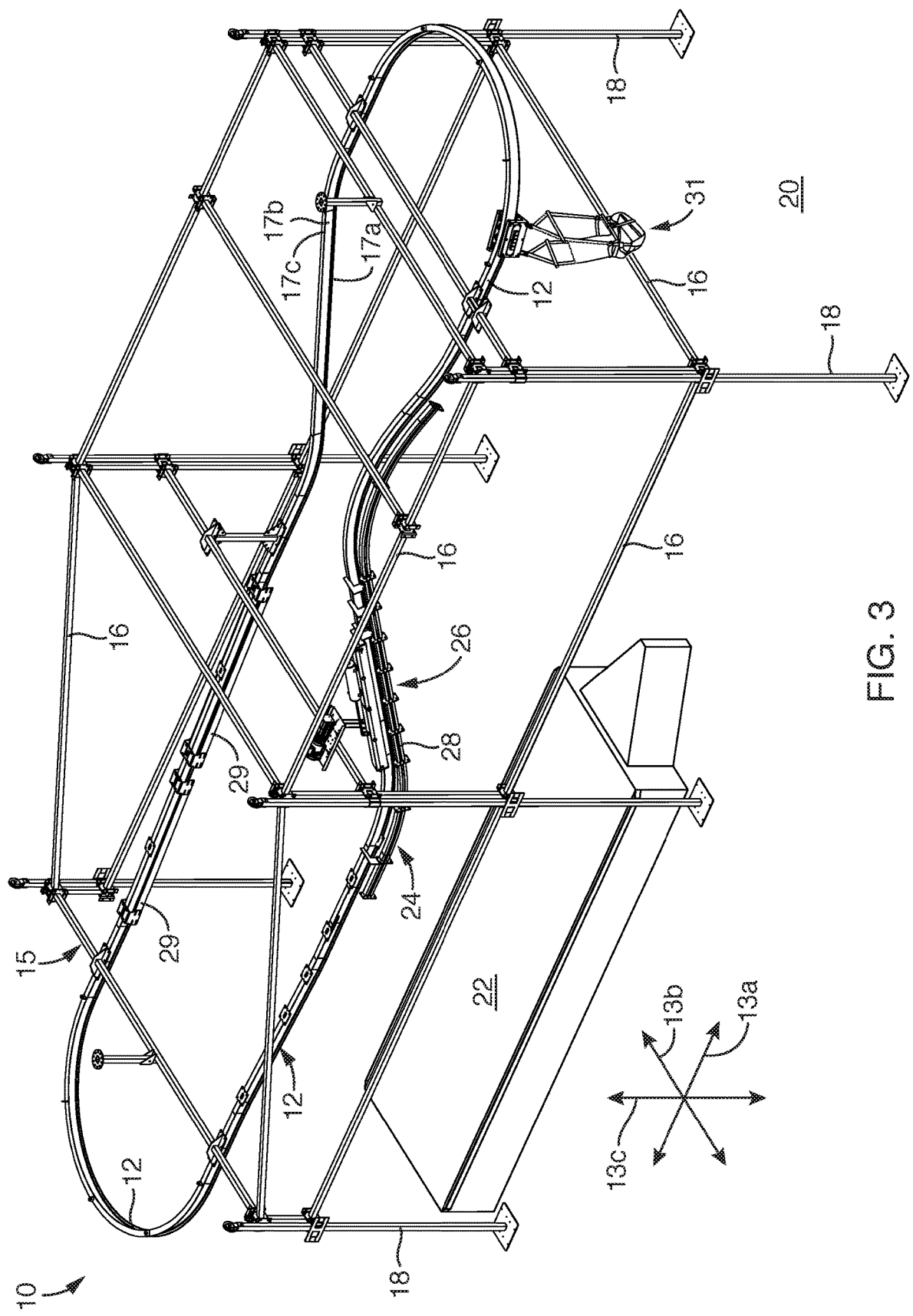
FIG. 3 is a perspective view of an alternative embodiment of a multiple level support and rail system for supporting a coaster in accordance with the invention.
Figure 4:
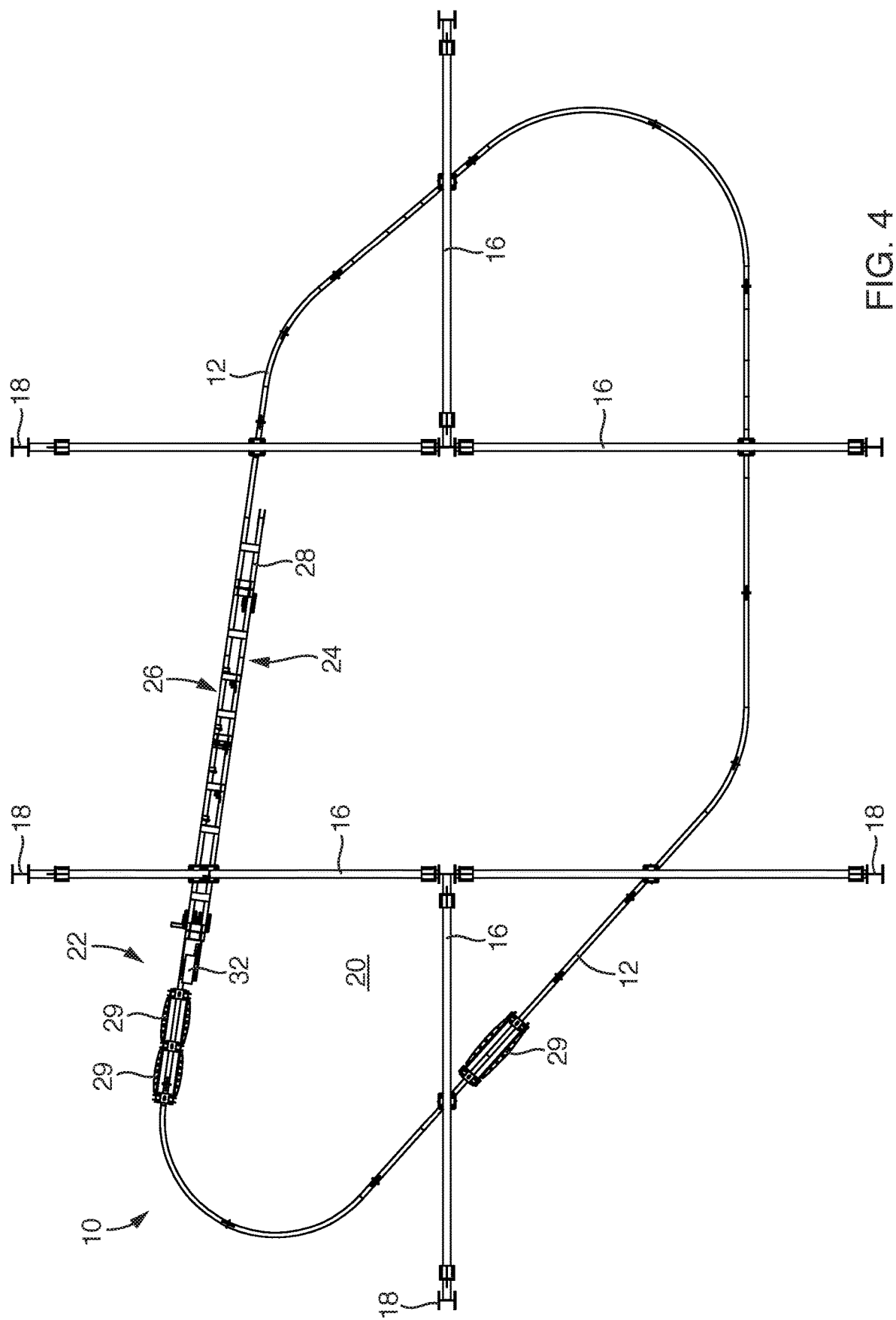
FIG. 4 is a top plan view of yet another alternative embodiment of a configuration for a coaster in accordance with the invention.

Referring to FIG. 1, as well as FIGS. 2 through 4 specifically, and FIGS. 1 through 37 generally, a system 10 in accordance with the invention may include a track 12 defining longitudinal 13a, lateral 13b, and transverse 13c directions. Cables 14 (FIG. 7) may be suspended from beams 16 thereabove to support each track 12 location from multiple angles. Accordingly, the vector forces on the track 12 at any location should be resolved by the horizontal forces all being neutralized by one another, leaving only a vertical support vector on the track 12.

Nevertheless, in the presence of a rider turning a corner laterally (horizontally) restrained by the track 12, the cables 14 in such an event have sufficient tension that they will overwhelm the force of the rider or the momentum of the rider. That force will be substantially less than the lateral preload on the cables 14 in order to neutralize horizontal forces or horizontal force factors with respect to the track 12. A track 12 may also connect rigidly to the beams 16.

Beams 16 are supported by pillars 18. Both may be formed of I-beam material. The beams 16 may be considered stringers 16 or rafters 16. The pillars 18 may be considered support posts 18, or the like. Typically, the pillars 18 are anchored or fastened to a supporting surface 20. The pillars 18 may actually have footings therebelow. The supporting surface 20 may support the pillars 18 directly, or the pillars 18 may actually be supported by footings under the supporting surface 20.

The system 10 includes a loading area 22 or deck 22 accessible to users who may load into harnesses or seats in order to travel along the track 12. A lift system 24 may include mechanisms to travel along a ramp 26 or incline 26 portion of a track 12. A lift track 28 may parallel the ramp 26 or incline portion 26 of the track 12. Thus, a lift track 28 may carry a lift trolley 32 or simply a lift chair. The lift track 28 may be of the same material and configuration as a carrier track 12 that actually carries the trolley 30 or cart 30 traveling along the track 12. Nevertheless, there is no requirement that the lift track 28 operate in the same manner. It simply is a very straightforward and self-managing system if the lift track 20 parallels the track 12 along the ramp 26 or incline portion 26.

In typical embodiments, the trolley 30 or cart 30 travels on wheels beside a lift trolley 32 operating along the lift track 28. At some point, the lift track 28 may diverge from the carrier track 12 in order to disengage the lift trolley 32 from the trolley 30 or cart 30 carrying a rider.

Referring to FIGS. 2 through 4, in alternative embodiments, stringers 16 or beams 16 may be the trusses 16 or beams 16 overhead in a building structure. In FIG. 2, beams 16 suspend the track 12 therebelow. Pillars 18 need only be the same posts 18 engineered to support the track 12 and the structure of the building. The supporting surface will typically be a floor 20, but will usually involve footings therebelow engineered to support building, beam 16, pillar 18, and track 12 structures.

Referring to FIG. 3, a path of a track 12 supported by a system of beams 16 on pillars 18 may take any configuration. For the simplicity of the drawings for this application, the illustration of multiple layers, multiple rises as well as corresponding declines in the elevation of the rail 12 as a rider passes longitudinally 13a therealong, have been removed. The drawings are sufficiently complex without trying to illustrate multiple layers. Likewise, not illustrated is the "roller coaster" effect of repeating rises and declines in which a trolley 30 would slow with increasing elevation and accelerate with decreasing elevation.

In the illustrated embodiment, both the track 12 and the beam 16 are shown as I-beam type construction. In each case, the rail 12 and beam 16 include a bottom flange 17a, a web standing in a vertical plane, and a top flange 17c. Both flanges 17a, 17c are nominally horizontal or extend in a nominally horizontal plane.

Of course, as the rail 12 may course longitudinally 13a along a chosen path, it may turn in a lateral direction 13b (left or right 13b). Likewise, the track 12 may be a strict coaster always tending to decline in a transverse direction 13c. Alternatively, the rail 12 may actually operate as a roller coaster that periodically inclines upward 13c and declines downward 13c to alternately decelerate and accelerate a trolley 30 operating thereon.

Multiple beams 16 or stringers 16 may move in different directions, and need not all be parallel to one another. Moreover, the stringers 16 or beams 16 may also operate at multiple layers. Thus, a track 12 may move in a serpentine course about various pillars 18, and may descend to suspend from lower beams 16, while originally suspending from upper beams 16.

Referring to FIG. 4, an eddy current braking system 29 (ECBS 29) may be set up to operate at a loading location 22. Necessarily, speed and stopping must be controlled in order to unload and load riders on trolleys 30. In the illustrated embodiment, a controlling ECBS 29 is also shown at a remote location away from a loading platform 22. For example, following a rapid decline, and just proceeding a comparatively sharp curve, an ECBS 29 may be applied to a trolley 30 in order to reduce the amount of lateral 13b swinging or rollout (roll) by a rider suspended in a harness system 31 under a trolley 30.

Referring to FIGS. 4 and 5A through 5C, an alternative embodiment of a course is illustrated with trolleys 30 and a lift trolley 32. In this embodiment, the structures constituting the beams 16 on their pillars 18 are comparatively regular in that they form a rectangular arrangement, perpendicular beams 16 are supported by an array of pillars 18, yet the course of the track 12 is not constrained to that distribution for its shape. Meanwhile, in all embodiments, the lengths and loads on cables 14, beams 16, and pillars 18 may be engineered to provide continuous descent, or an up-and-down 13c, undulating path similar to a conventional roller coaster. Momentum will carry uphill and decrease, then recover when passing downhill, over an undulating path.

Figure 5A:
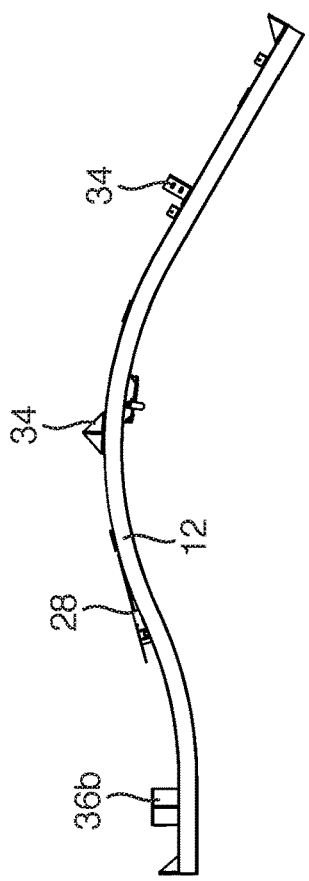
FIG. 5A is a perspective view of a portion of a carrier track associated with a lift track in accordance with the invention.
Figure 10:
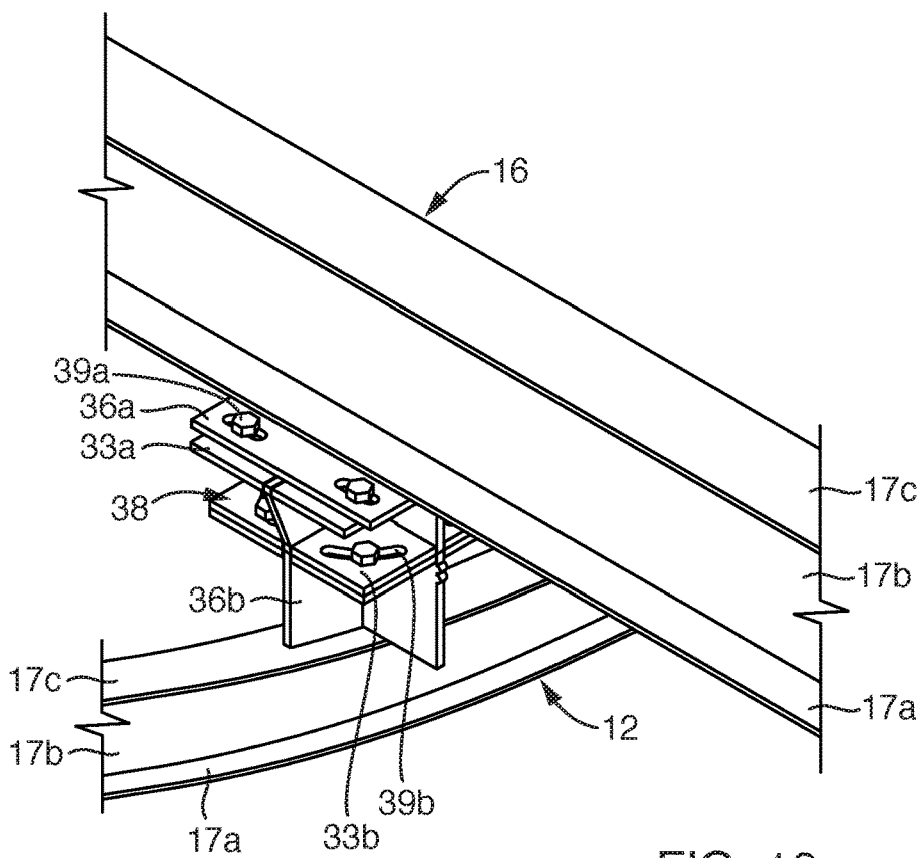
FIG. 10 is a perspective view thereof installed to connect an overhead beam to a curved portion of a suspended rail therebelow.
Figure 11:
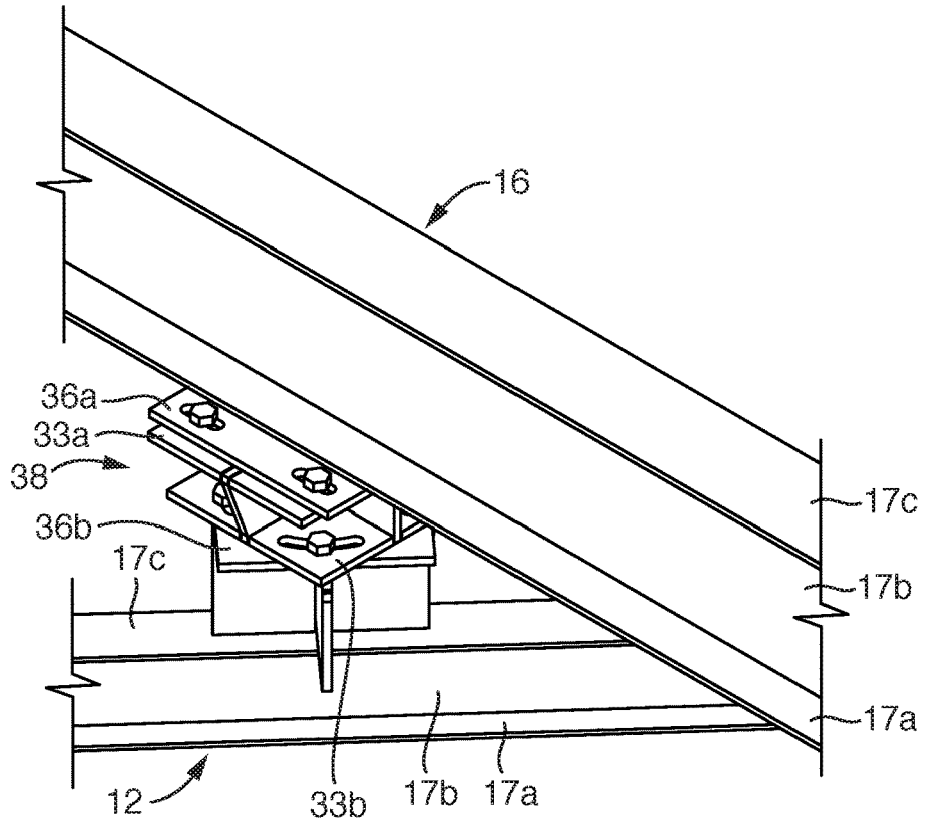
FIG. 11 is a perspective view thereof installed to connect an overhead beam to a straight portion of a suspended rail crossing diagonally therebelow.
Figure 12A:
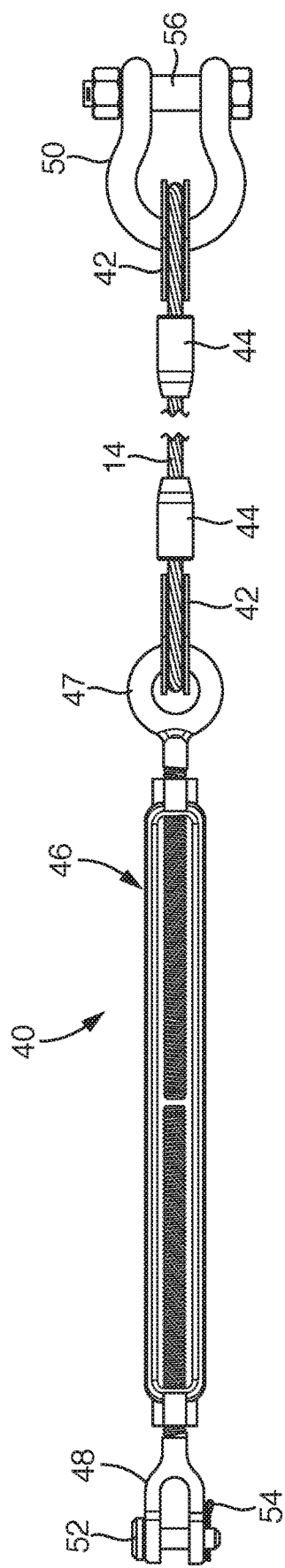
FIG. 12A is a top plan view of one embodiment of a supporting cable system for supporting the track in accordance with the invention.
Figure 12B:
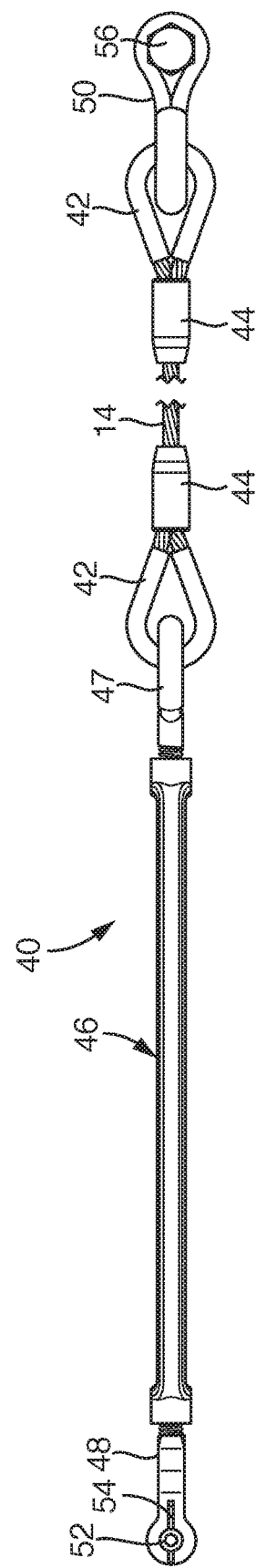
FIG. 12B is a side elevation view thereof.

Referring to FIGS. 5A through 12A and 12B, while continuing to refer generally to FIGS. 1 through 37, a Figure number absent trailing letters indicates all Figures having that leading numeral. FIGS. 5A-5C illustrate a short portion of overall tracks 12, 28. FIGS. 6A through 9 illustrate a "static universal" system for solidly supporting a rail in an I-beam configuration. FIGS. 12A and 12B illustrate cable assemblies 40 for suspending a track 12 or rail system 12 by vectors (cables 14) of support.

Figure 5B:
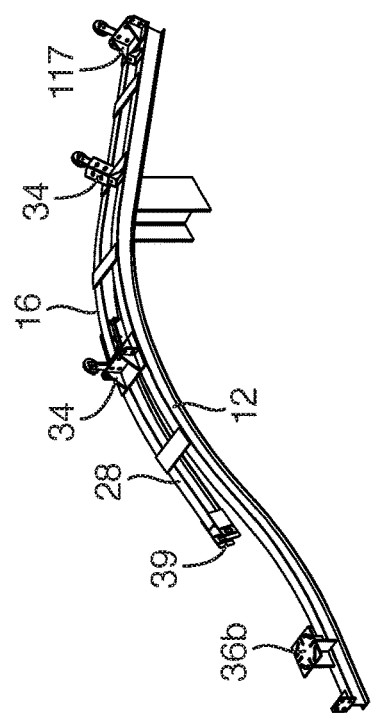
FIG. 5B is a side elevation view thereof.
Figure 5C:
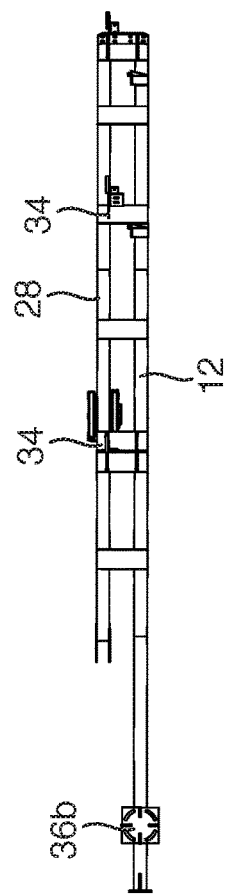
FIG. 5C is a top plan view thereof.

Referring to FIGS. 5A-5C, a rail 12 may rely on a system of simple brackets 34 for support. These brackets 34 may also connect together the main trolley rail 12 and the lift trolley rail 28. If cable assemblies 40 support the rail 12, these may still be adequate.

Referring to FIGS. 6A through 11, while continuing to refer generally to FIGS. 1 through 37, a system of plates 33 may be assembled to fit with the mounts 36 in order to suspend a rail 12 below the beam 16 in a system 10 in accordance with the invention. For example, a plate 33a may be juxtaposed to a plate 33b interconnected with and by intermediate vertical plates 33c and 33d.

Referring to FIG. 6A, an assembled unit 38 operates as a core 38, also referred to as a "static universal" 38. By providing several degrees of freedom and substantial adjustability in order to find a fit and make a fit, the static universal 38 differs from a conventional "universal joint unit."

A universal joint rotates in operation. The purpose of the universal joint is to provide alignment between two shafts that are very difficult to align, and may not be aligned or even parallel. A conventional rotating universal joint should never stand alone. Rather, universal joints are used in pairs. Each universal joint is connected at an outer (outboard) end to a shaft. One of those universal joints must be able to slide along their mutually interconnecting shaft. It is typically provided with a spline for that purpose. Meanwhile, the two universal joints connect at their inner (inboard) end of each to that connecting shaft. Usually, this connecting shaft is the location where the slide (e.g., spline) is positioned.

In contrast, the static universal 38 is designed to ease alignment between a rail 12 suspended below a supporting beam 16 and then rigidly fix that fit.

Before explaining the operation of the universal 38, the construction thereof should be understood. In general, a plate 33a is connected to a plate 33b by two plates totally orthogonal 33c, 33d. Each individual plate 33c, 33d is provided with tabs fit into slots 39c in plate 33a and slots 39d in plate 33b. In fact, tabs of each of the plates 33c, 33d are received into each of both plates 33a and 33b.

Moreover, the two plates 33c, 33d are also slotted with slots 39e, 39f in order that they themselves may be slotted together. In this way, the static center 38 is a stack of plates 33a horizontally welded to plates 33c, 33d, to which is welded the juxtaposed plate 33b. A suitable length of welding bead may be applied at the intersection of any two of the plates 33a, 33b, 33c, 33d.

Referring to FIGS. 7, 8, and 9, the various views, typically a bottom plan, end elevation, and side elevation view, respectively, illustrate the orientations and locations of various slots 39a, 39b. These are provided for attaching the static universal 38 to a mount 36a on a beam 16, and a mount 36b on a rail 12 to be suspended below the beam 16.

The mounts 36a, 36b may essentially look much like the plates 33a, 33b. However, the slots 39a in the plate 33a may typically be oriented to extend at right angles to the corresponding slots 39a in the mount 36a. Meanwhile, the mounts 36 may each appear to be or to be constituted by three out of the four plates 33a, 33b, 33c, 33d illustrated for the static universal 38. Accordingly, a mount 36 may look very much like the static universal 38 absent one non-matching plate. In place of that plate will be welded the beam 16, or the rail 12. Alternatively a clevis (or several) and cables 14 may connect to a plate 33c, 33d.

Referring to FIGS. 10 and 11, two common alignment issues are demonstrated by a curved portion of a rail 12 suspended below a beam 16, and a straight portion of a rail 12 passing diagonally under a beam 16. In the illustrated embodiments, one can see that apertures 39a in the plates 36a, 36b, are connected by bolts to the plates 33a, 33b through the apertures 39a in that corresponding plate 33a, 33b. By positioning the slots 39a in the carrier plate 36a or mount 36a and providing sufficient length of those slots 39a, a wide window of opportunity and tolerance exists to receive a bolt wherever the two slots 39a from the plates 33a, 36a cross one another. Thus, initial close fits and tight tolerances are avoided.

Similarly, if adjustments need to be made, the position of bolts in the slots 39a may be shifted by simply moving the plate 33a with respect to the plate 36a before the bolts are tightened. Meanwhile, the slots 39b in the plates 33b, 36b may be rotated through a wide angle to coincide. It has been found that angles on the order of 60 degrees are completely tractable, and provide a virtual assurance of overlap between the slots 39b in the respective plates 33b, 36b. Accordingly, the rail 12 may be assembled loosely to the beam 16, by securing bolts through the slots 39b.

Then, adjusting the position of the plate 33a with respect to the plate 36a will fit the static universal 38 in translation (linear motion; an engineering and mechanics term of art, as opposed to rotation). In other words, the slots 39b in the plates 33b, 36b provide for a rotational degree of freedom to achieve alignment. The slots 39a in the plates 33a, 36a provide for translation in two dimensions (degrees of freedom).

Three degrees of freedom, two in translation and one in rotation, are provided for securing alignment. The vertical degree of freedom in translation and the rotational degrees of freedom about a vertical 13ac axis are available by a fastener (e.g., bolt). Vertical translation is needed to secure the rail 112 and universal 38 to the beam 16.

In other words, securing the static universal 38 to the mount 36a is intended to rely on, then lock in and remove, the degree of freedom in a vertical direction 13c. Similarly, securement of the static universal 38 to the mount 36b of the rail 12 is intended to cinch the juxtaposed plates 33b, 36b together, thus removing any ability to move in a vertical direction 13c.

It is certain that adjustment in the vertical direction 13c is available, simply by choosing the length of bolts to connect the mounts 36a, 36b to the static universal 38. Thus, one may look at that connection scheme as permitting a third degree of freedom of adjustment, but differs. That is, the degree of freedom in the vertical 13c or transverse 13c direction is intended to apply force, not relieve it. It is intended to move components together, not align them freely prior to securement together as with the slots 39 between the mounts 36 and the static universal 38.

Thus, in general, beams 16 and rails 12 may be built according to manufacturing drawings with liberal tolerances. At some point, the mounts 36a, 36b will be secured thereto according to the drawings. This may be done onsite or in a factory. By use of the static universal 38, three degrees of translation and a degree of rotation may all be provided to secure alignment and attachment of the mounts 36a, 36b.

In general, I-beam material is a useful structural material. The principle of construction and engineering discussed as "section modulus" refers to the cross-sectional area of material, and where that cross-sectional area is in the net cross section of the envelope (outside perimeter) of a structural element such as a beam 16 or a rail 12. Section modulus relates to the integral of a distance squared from the center (neutral axis, a central location at which no bending stress exists) in a member having compression at one extreme outer fiber and tension at the opposite extreme outer fiber.

A solid material, for example, may have a circular cross section, rectangular cross section, or another. Such a member is heavier than it needs to be to provide its function in most cases. Rather, so long as a flange 17a is left at the outermost extremum of dimension across a beam 16, or a rail 12, and another flange 17c is provided at an opposite extremum, only a web 17b of material need connect them to space them apart, protect against buckling, and so forth. Thus, the I-beam is a useful structure with an efficient strength-to-weight ratio, characteristic for static support.

In a system 10 in accordance with the invention, it has been found that rails 12 may be fabricated to curve in a lateral direction 13b (side to side 13b) or in a transverse direction 13c (up and down, vertically 13c) in order to provide acceleration, deceleration, and turning. However, it has been found that construction may be simplified by limiting curvature of a rail 12 to a single direction 13 at a specific location. Thus, there is no need to compound a transverse 13c incline or decline with a lateral 13b turn. Instead, throughout any longitudinal 13a expanse, a rail 12 may be proceed straight, through a turn in a lateral direction 13b or through a rise or fall in a transverse (vertical) direction 13c.

In certain embodiments, the track 12 may be joined in segments welded together or bolted together based on associated flanges extending from one segment and connecting to flanges of another. Thus, track 12 may be bolted together one joint at a time for assembly and shipping. In certain embodiments, the connection of the track 12 to the frame structure 15 or framing system 15 may be by means of cables 14, static universal 38, or by direct connection. In certain embodiments, ball joints may be used between a beam 16 and a track 12 in order to provide support vertically, restraint in a longitudinal 13a, lateral 13b, and transverse (vertical) direction 13c while still permitting some degree of freedom in rotation.

Likewise, each segment or section of a track 12 may have mounting apertures drilled in it in order to accept connections to various brackets such as those required to connect to the lift system 24, and ECBS system 29, stops or brackets for an anti-roll-back arm 92, various sensors such as optical or proximity sensors which may operate on a radio frequency, light, or other physical sensibility. Meanwhile, other systems such as motors and drives may also be connected by brackets for which mounting apertures may be provided in a section of track rail 12.

In certain embodiments, the track 12 may be shaped different 14 in different areas. For example, an I-beam structure inside a building may be suitable since standard lengths may be appropriate inside buildings. For longer spans, a track system 12 such as a truss track 60, sometimes called a space track 60 may be used. These are effectively trusses 60 with larger section modulus for their weight and can span greater distances without as many intermediate supports required.

I-beams tend to be comparatively heavier for their strength than a truss track 60. Accordingly, a longer or taller dimension across a truss track assembly 60 may provide improved strength-to-weight ratio and simplify assembly. On an I-beam track 12, a rider may still have the thrill of the rolling motion represented by swinging in a lateral direction 13b (a roll motion in aircraft parlance) on turns. This is discussed in more detail elsewhere herewithin.

Referring to FIGS. 6A through 9, another type of bracket 38 may be thought of as a static universal 38. Mounts 36 are secured to carrier tracks 12, while other mounts 36 secure to the beams 16, typically by welding in each case. The adjustable bracket 38 then secures the mounts 36 together, a top mount 36a on the beam 16 and a bottom mount 36b secured to the carrier track 12.

Here again, a reference numeral having a trailing letter refers to a specific instance of the item or type designated by the reference numeral. Thus the numeral alone refers to the item or type, while the number with a trailing letter points out a particular instance thereof.

Meanwhile, an adjustable bracket 38 or static universal bracket 38 is designed to bolt to, and slide with respect to the adjustable mounts 36. Adjustable mounts 36a have slots 37 configured as straight slots 37a. Similarly, the top of each static universal will have straight slots 37a oriented to extend at right angles to the slots 37a in the mount 36a. Thus, the brackets 38 may translate with respect to the mounts 36a due to the crossing of slots 37a.

Arcuate slots 37b are in mounts 36b and at the bottom plate 33b of the universal 38. Thus, the universal bracket 38 may rotate to align with respect to the mounts 36b by a full (but interrupted) circle. The result is to virtually neutralize the discrepancies in dimensions and the resulting force operating to misalign the mounts 36a, 36b, and the static universal brackets 38. Alternatively, one may regard the mounts 36 and bracket 38 together as the "static universal" 38.

In this way, no couple occurs. The term "couple" is an engineering and construction term of art indicating a net force tending to rotate (produce torque). Typically, two forces are positioned as equal and opposite, parallel, but not co-linear, such that that they tend to rotate a body. A couple need not exist within the bracket 38 where it could cause misalignment during assembly or construction, distort the loading and possibly deflect the track 12 in operation.

One will note, that an adjustable bracket 38 may be designed in multiple pieces that may be fitted and welded together to form a system of apertures 37. The apertures 37a on one face are straight slots 37a. Slots 37b are elongated about a circumference or circumferential direction, at some radius matched to a similar radius upon the mount 36b. Straight slots 37a in the mount 36a and bracket 38 slots 39b are orthogonal.

Accordingly, the adjustable bracket 38 may be rotated with respect to the adjustable mount 36b, in order to align simply and easily. Slots 37a virtually always align across slots 39a, because they cross orthogonally and are elongated to several "width" values in length (e.g., ½ inch×2 inches, 1.3×6 mm). They bolt together on a plane in a nominally horizontal direction and neutralize the force vectors therein.

Meanwhile, other weldments or fasteners may exist in order to secure the lift track 28 in fixed, rigid-body, relation to the carrier track 12. At some point, an end of the lift track 28 may include a chain return in or about which a chain may roll on a sprocket to operate in a continuous manner along the carrier rail 28. Typically, the end (terminal end or distal end) of the lift track 28 may diverge up, down, or horizontally away from the carrier track 12, in order to disengage a lift trolley 32 from a carrier trolley 30 or passenger trolley 30.

Referring to FIGS. 5A and 5B as well as FIGS. 12A and 12B, while continuing to refer generally to FIGS. 1 through 37, a cable system 40 or cable assembly 40 may include thimbles 42 about which cables 14 are wrapped in order to be gripped by a clamp 44, seal 44, lug 44, or the like. In other words, a lug 44 may be deflected inelastically (plastically) in engineering terms. This means it has been yielded mechanically to permanently distort, and not elastically return to its previous shape. A lug 44 may secure the cable 14 to itself at the very end thereof to wrap around a thimble 42 protecting the individual strands against abrasion in the cable 14.

A turnbuckle 46 may connect to an eye 47 for securing to a thimble 42 in the cable 14. Meanwhile, at an opposite end of the turnbuckle 46, a clevis 48 may secure to a plate or one of the apertures in a plate of the brackets 34a or directly to an adjustable bracket 38 supporting a track 12, 28. Meanwhile, at the opposite end thereof, another clevis 50 may connect to a supporting member 16,18. A bracket 34 or eye may secure to one of the beams 16 or pillars 18.

Typically, a bolt 56 may secure a clevis 50 at the anchor end of the cable assembly 40. Meanwhile, a pin 52 such as a smooth pin having a head on one end and a keeper 54 such as a cotter pin on the other end may secure the clevis 48 to a bracket 38 or other mechanism or device for connecting to a track 12.

Figure 13:
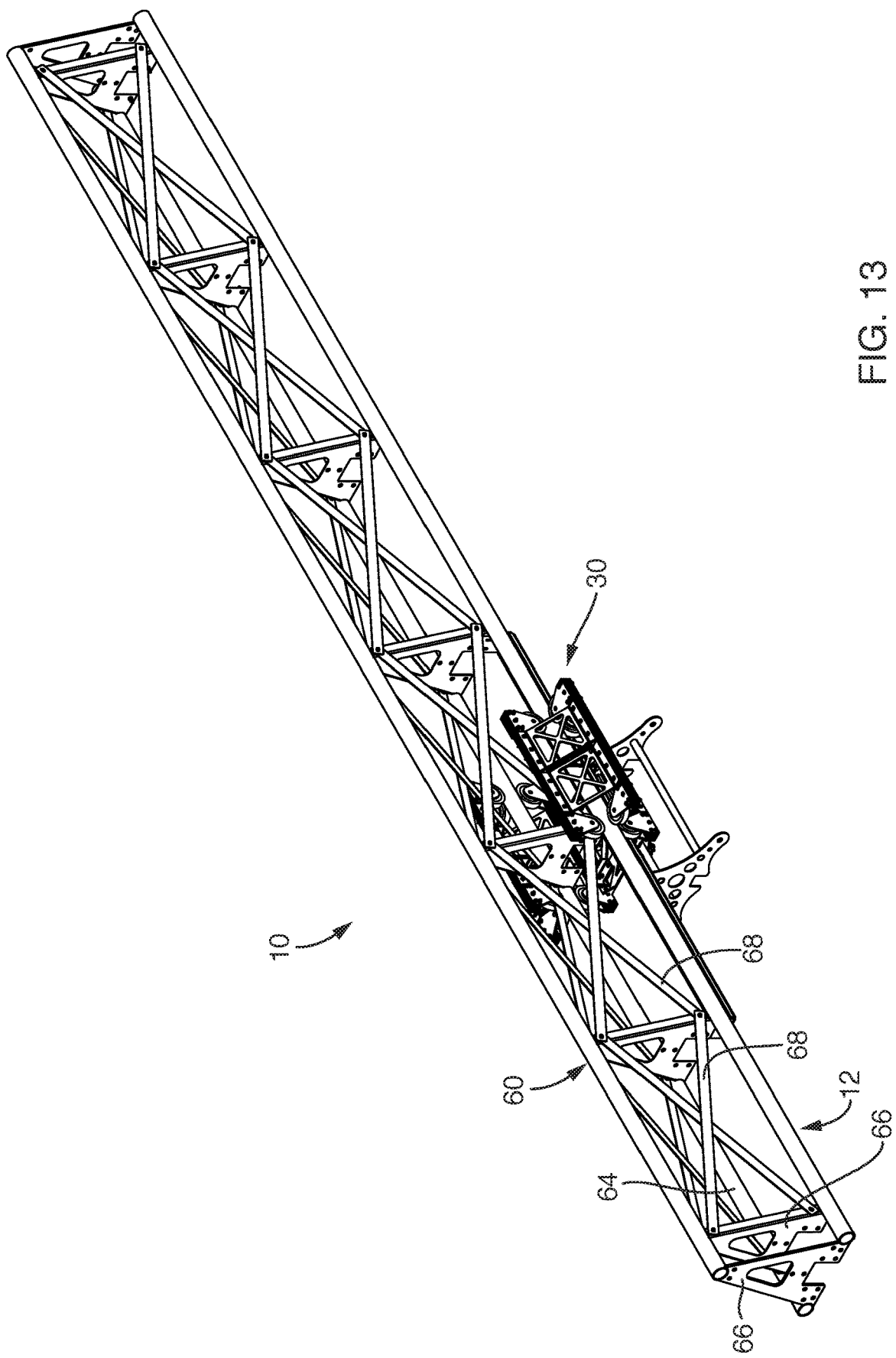
FIG. 13 is a perspective view of an alternative embodiment of a track in accordance with the invention, with a particular embodiment of a trolley or car mounted thereon.

Referring to FIG. 13, a truss track 60 is one embodiment of a track 12 useful in accordance with the invention. The truss 60 may include a top tube 62 or suspense tube 62 that will be bracketed by a beak (e.g., two-piece, axially-divided cylinder; or upper and lower plates capturing another therebetween) a tab, an eye, or other bracketing system in order to secure the overall truss 60 to the cables 14 by cable assemblies 40. Any or all of the system described herein for connecting to cables 14 may be used on this type of a truss assembly 60 for a track 12. In a manner of speaking, the lower tubes 64 or bottom tubes 64 operate as the actual track 12 in contact with wheels 70.

Meanwhile, frames 66 or spacers 66 may provide structural strength, stiffness, and alignment of the top tubes 62 and bottom tubes 64 with respect to one another. Accordingly, the tubes 62, 64 may be curved, bent, or the like in order to accommodate any overall shape of the longitudinal 13*a* path of the cross section thereof. In this way, the cross section and the relative spacing of the tubes 62, 64 with respect to one another remain the same throughout. However, the frames 66 maintain that relative position, and the rigid-body connection therebetween.

The path of a line (e.g., curve) down some central axis or centroid (an engineering term of art used here as commonly known in the engineering art) of the area of the truss 60 travels along a path that ultimately becomes the axial 13*a* or the longitudinal 13*a* path along a longitudinal axis 13*a* of the truss 60. The bottom tubes 64 form a track 12 operating, typically spaced therebelow, along that path.

Struts 68 may be fastened mechanically by bolts, rivets, brackets, or other fasteners, welding, or other mechanism in order to space apart and stiffen the tubes 62, 64 with respect to one another. Meanwhile, a trolley 30 operates along the bottom tubes 64 as a track 12 supporting that trolley 30.

The bottom flange 17*a* of an I-beam having a vertical web 17*b* also may serve as a track 12. In such an embodiment, the rail 12 may be heated and formed to decline, incline, turn right, turn left, or twist. Twisting is not preferred. Permitting a rider to swing (roll) outside a turn in response to centripetal force adds a "roll" element to the ride. There is no need to twist the rail. A series of bends, in one degree of freedom at a time, permit downhill, uphill, left, right, and roll reactions. Roll, yaw, and pitch are used here in the same sense as in aircraft and engineering generally as rotations or pivoting about a longitudinal 13*a* axis, transverse 13*c* axis, and lateral 13*b* axis, respectively.

Figure 14:
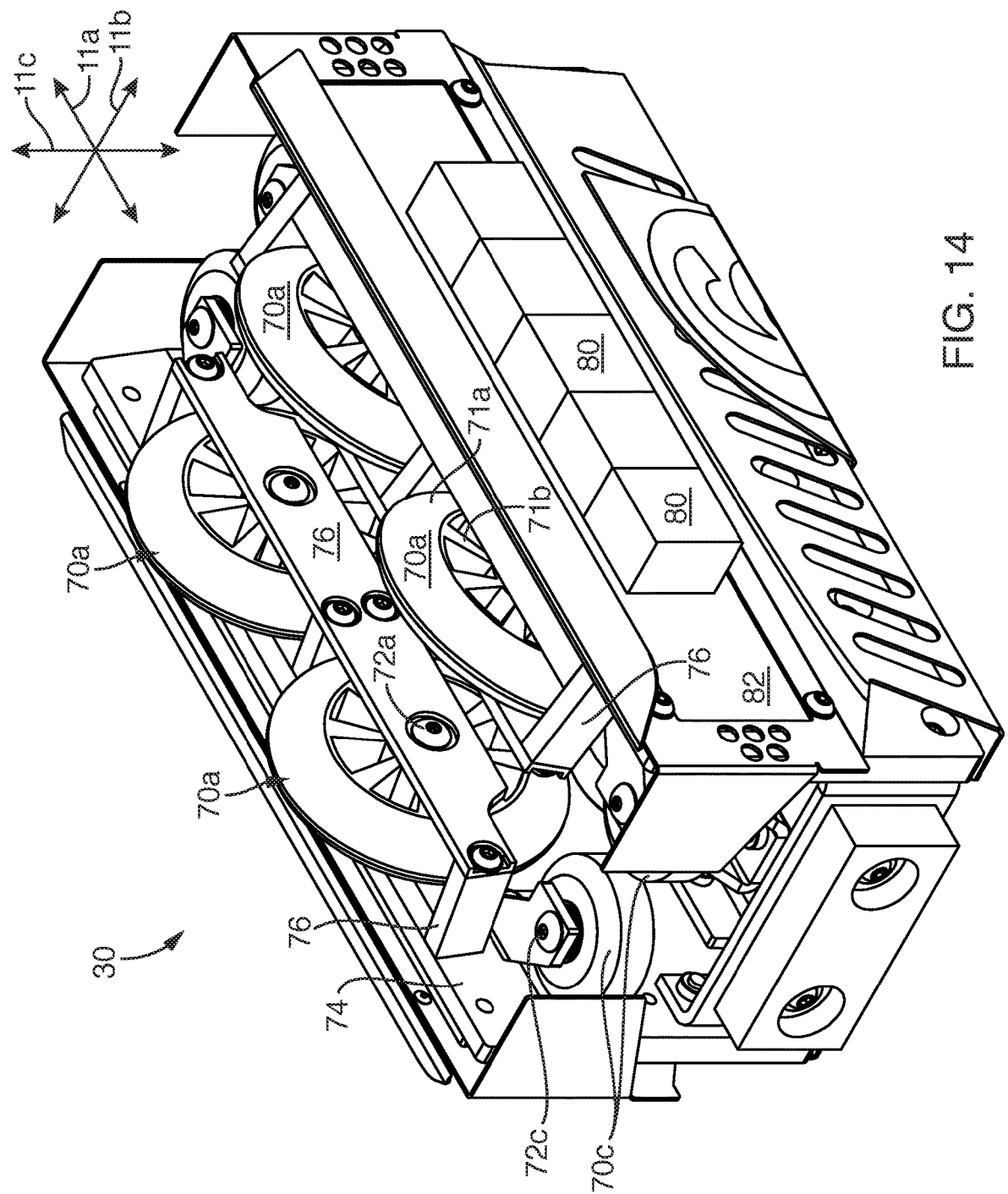
FIG. 14 is a perspective view of a different embodiment of a car or trolley in accordance with the invention, relying on tires and wheels for support such as for operating on a track having comparatively flat aspect, such as a bottom flange of an I-beam type of track.
Figure 15:
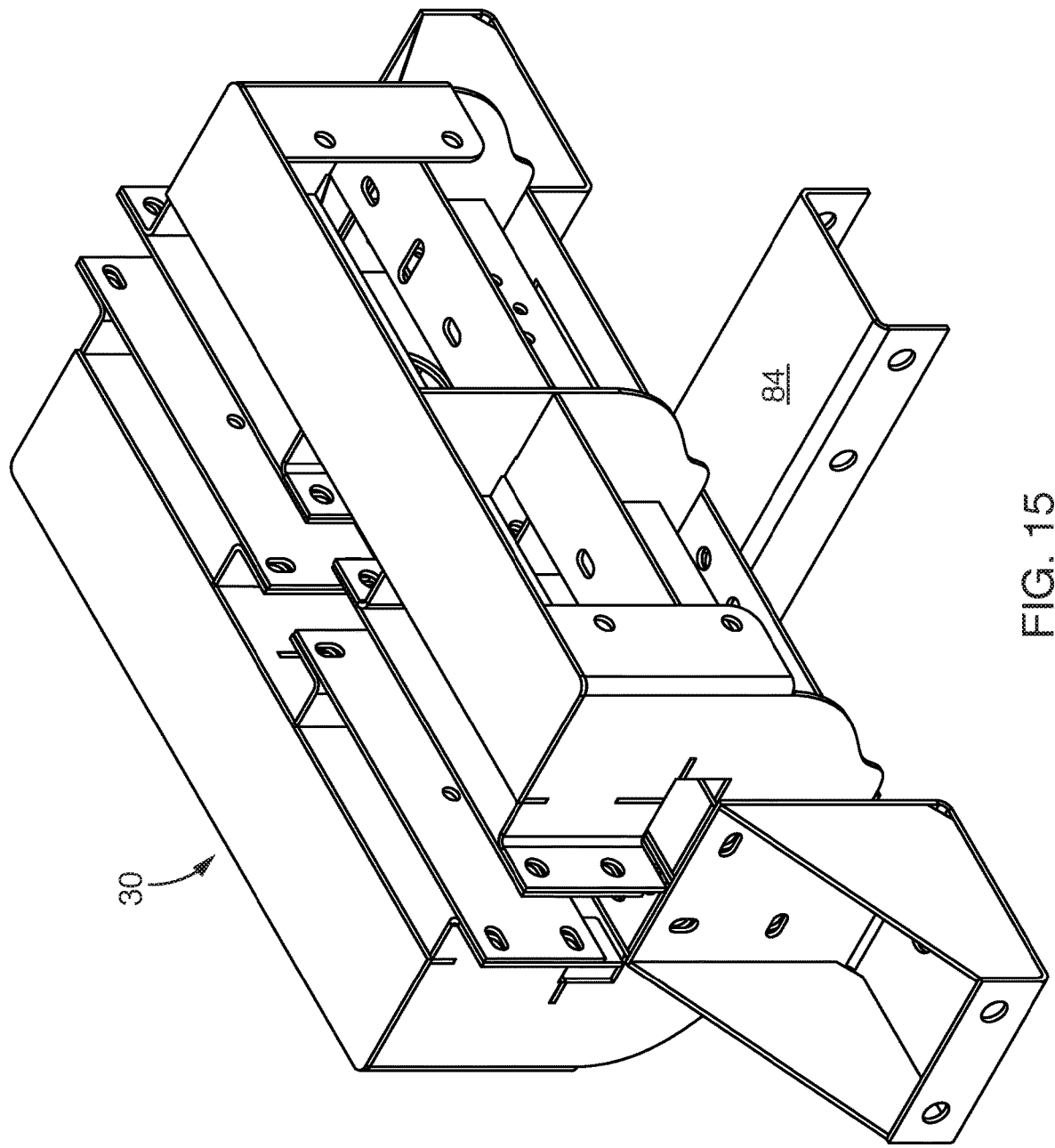
FIG. 15 is a perspective view of a frame of the trolley of FIG. 14.

Referring to FIGS. 14 and 15, while continuing to refer generally to FIGS. 1 through 37, in an alternative embodiment of a trolley 30, rollers 70 or wheels 70 may operate as carriers 70*a*, idlers 70*b*, and guides 70*c*. In the illustrated embodiment, the carriers 70*a* include not only a tire 71*a* but an inner wheel 71*b*. The rollers 70 typically operate on axles 72.

Herein, a designation of a reference number indicates a component and a component type. A reference numeral followed by a trailing alphabetical character indicates a specific instance of the item or type designated by the reference numeral.

Accordingly, it is proper herein to speak of all the rollers 70 or any rollers 70, and specific types or positions of rollers 70 as carriers 70*a*, idlers 70*b*, and guides 70*c*. The difference therein is that carriers 70*a* typically carry the principal load of the weight of the trolley 30 and the weight of the equipment and a rider therebelow. Meanwhile, idlers 70*b* typically oppose the carriers 70*a*, but only apply force when required to downwardly restrain the trolley 30 and maintain its position along the track 12.

Typically, guides 70*c* operate for horizontal stability, like the idlers 70*b* act for vertical stability, to maintain lateral position or stability of the trolley 30. In the event that a rider passes through a turn along the track 12, there will be a momentum component as centripetal forces must make that turn and pull the rider along the curvature of the track 12. The guides 70*c* may contact the track 12 in order to provide supporting lateral forces.

Each of the rollers 70 rotates around an axle 72. Accordingly, the axle 72*a*, 72*b*, 72*c* correspond, respectively, to the rollers 70*a*, 70*b*, 70*c*.

A frame 74 may support all of the rollers 70 by various brackets 76. Likewise, the frame 70 may ultimately be covered with covers 78 that act to provide cosmetic appearance as well as to guard against fingers of an operator or rider being placed at pinch points or other dangerous positions with respect to the wheels 70 or rollers 70 of a trolley 30.

Magnets 80 are aligned along a plate 82 or bracket 82 secured to support the array of magnets 80. The magnets 80 may extend as an array in various directions. For example, the longitudinal direction 13*a* is a direction of travel. A horizontal direction 13*b* is a side-to-side direction. Meanwhile, a vertical direction 13*c* may be thought of as an up-and-down direction. Thus, a vertical descent provides a gravitational force or acceleration moving a trolley 30 along a track 12 in a longitudinal direction 13*a*. Meanwhile, turns may result in forces acting on the trolley 30 to put the guide 70*c* in contact with a track 12.

Referring to FIGS. 14 through 34, while continuing to refer generally to FIGS. 1 through 37, each of the trolleys 30 may include an engagement arm 84. For example, in FIG. 15, the trolley 30 of FIG. 14 has been stripped down to its frame 74. Accordingly, the various brackets 76 may secure to the frame 74, holding axles 72 for the various rollers 70.

Figure 16:
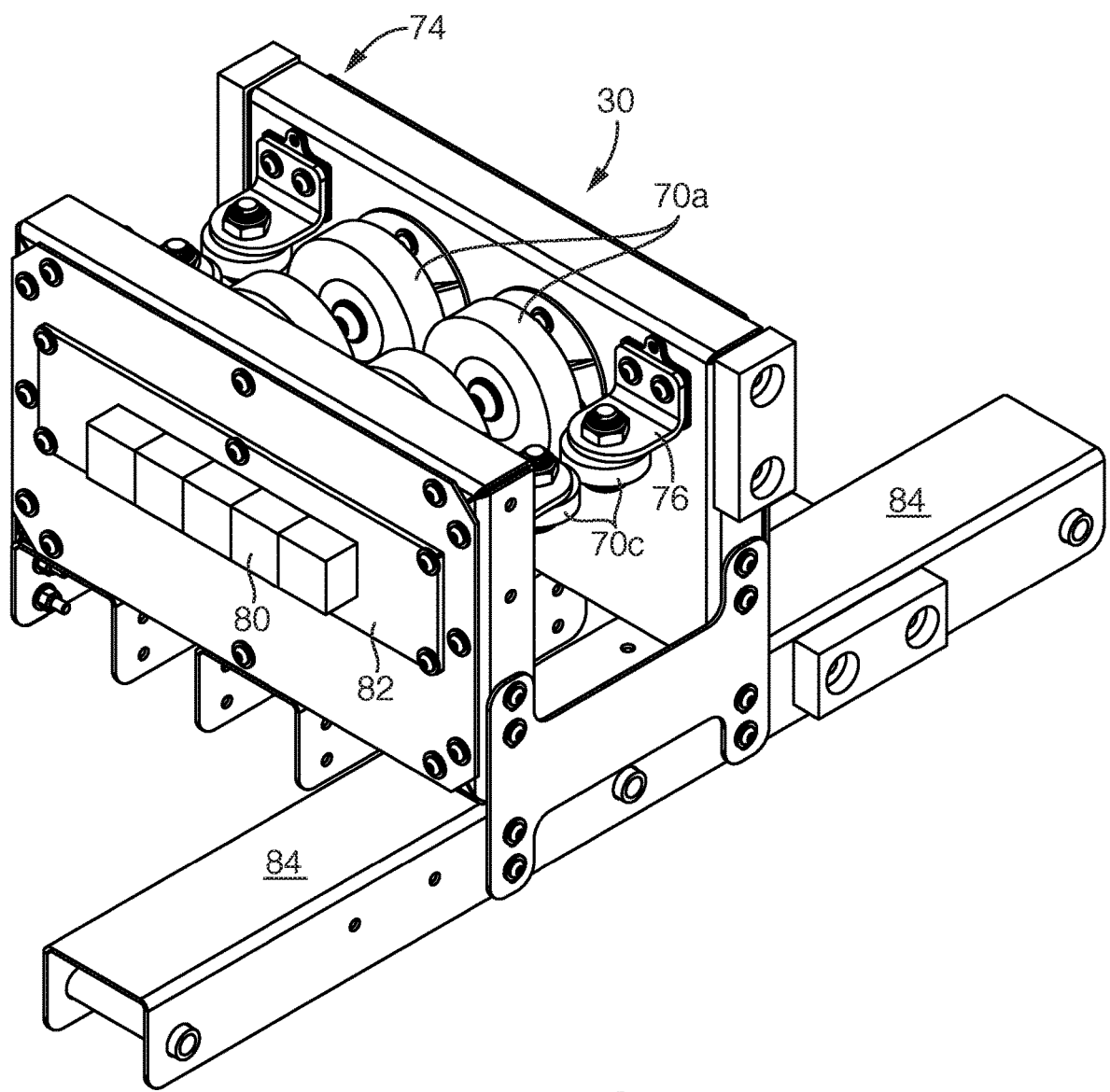
FIG. 16 is a perspective view of an alternative embodiment of a trolley in accordance with the invention, illustrating an engagement arm for engagement by a lift trolley.

Meanwhile, the engagement arm 84 extends laterally outward away from the track 12 and the trolley 30 in order to engage the lift trolley 32. The engagement arm 84 may actually extend horizontally in both directions, as illustrated in FIG. 16. Meanwhile, the rollers 70*a* need not have rubber tires. They may simply be steel rollers 70. Nevertheless, the structure of wheels 70 will depend upon various engineering factors and comfort factors for a rider.

Figure 17:
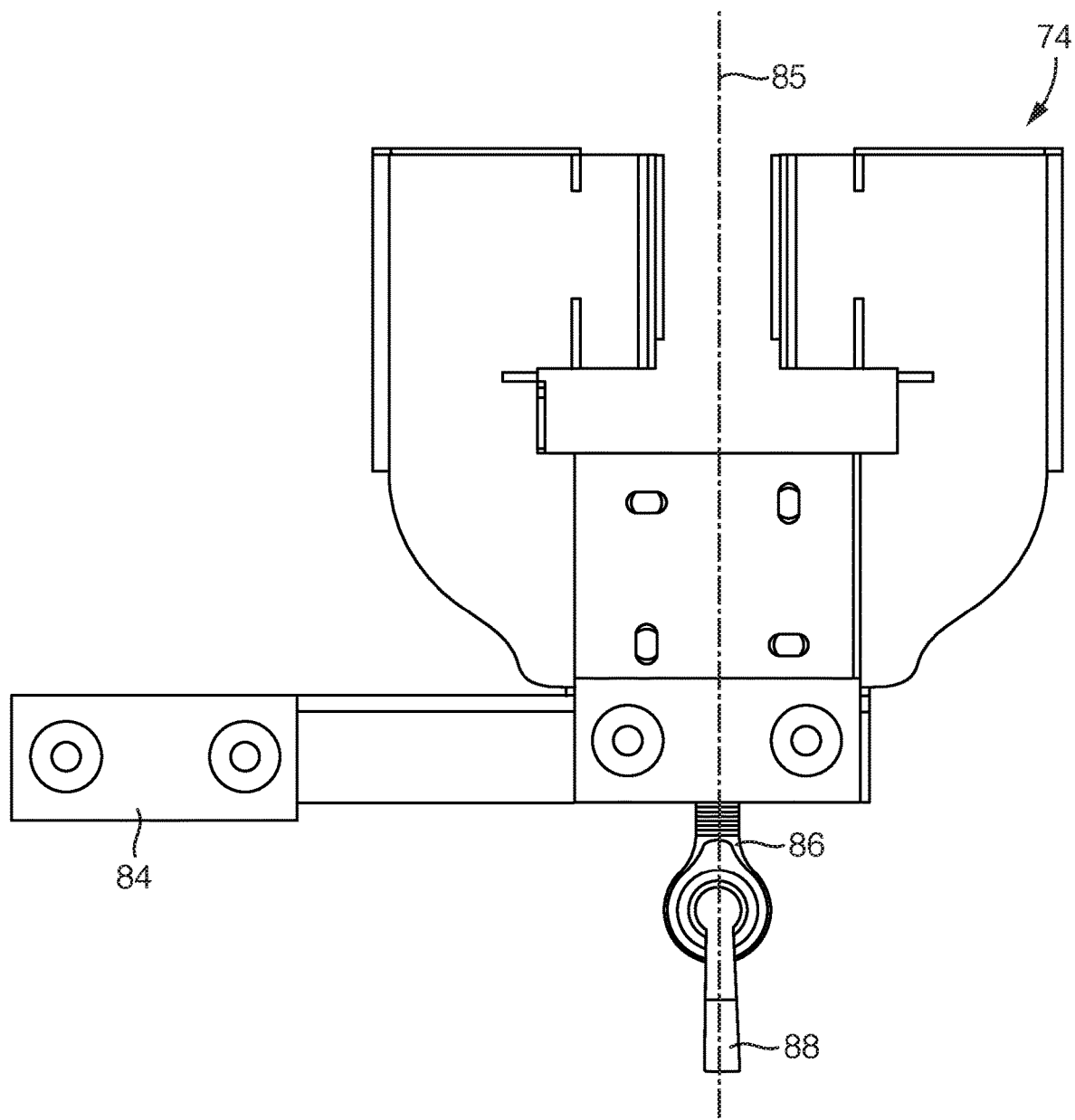
FIG. 17 is an end elevation view of one embodiment of a trolley frame in accordance with the invention illustrating the connections system or supporting a harness therebelow.
Figure 18:
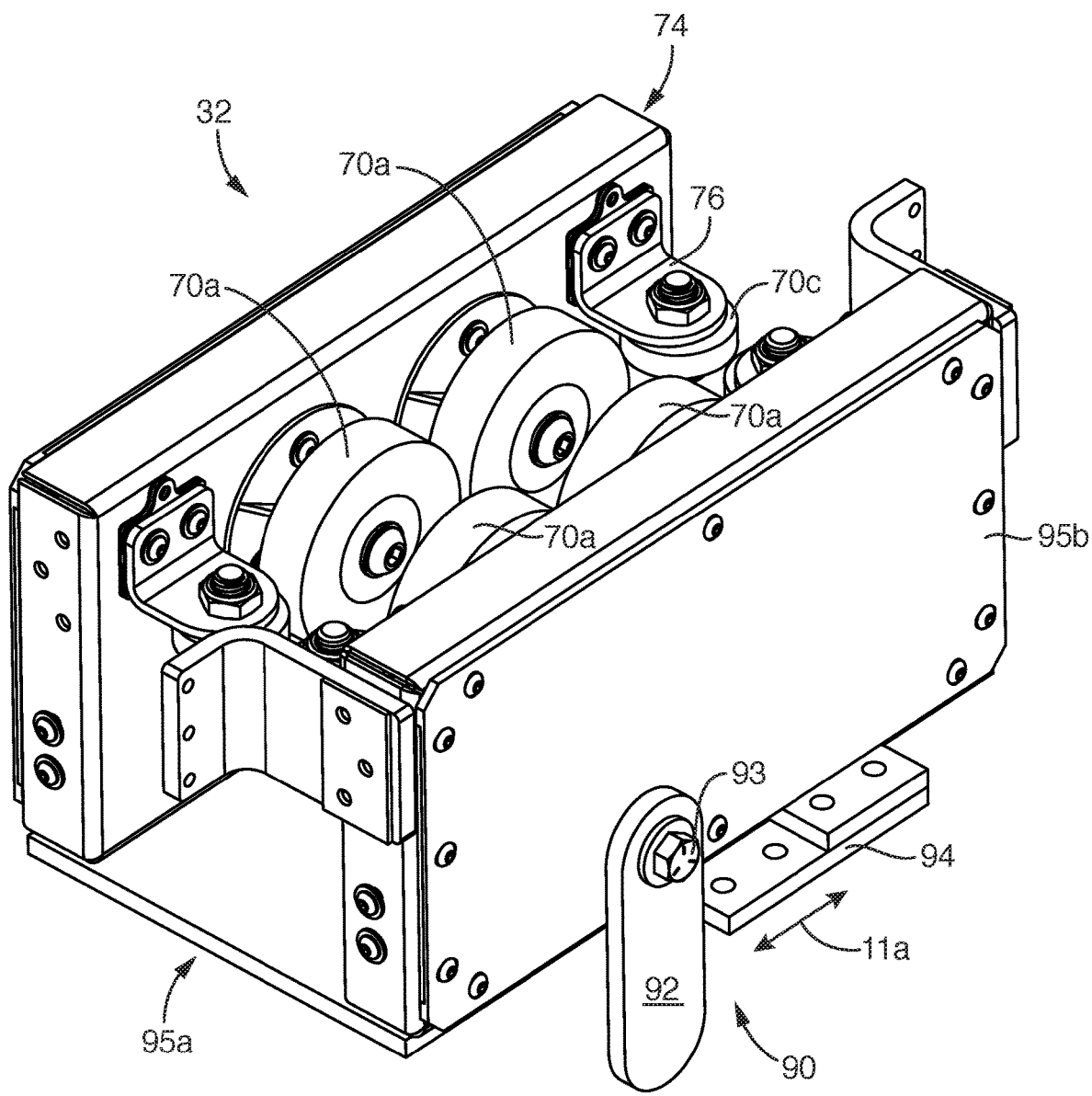
FIG. 18 is a frontal, upper perspective view of one embodiment of a lift trolley showing a swing arm for engaging the engagement arm of a carrier trolley.
Figure 19:
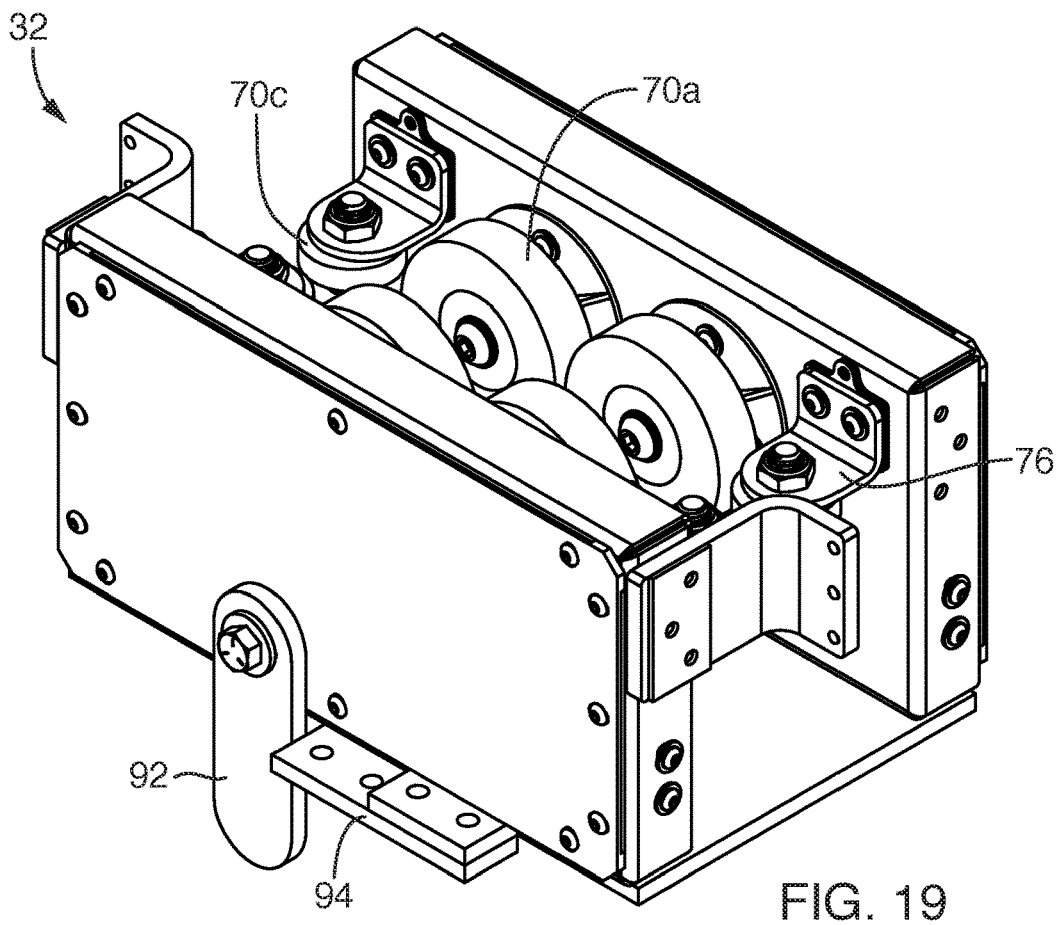
FIG. 19 is an upper, rear perspective view thereof.
Figure 20:
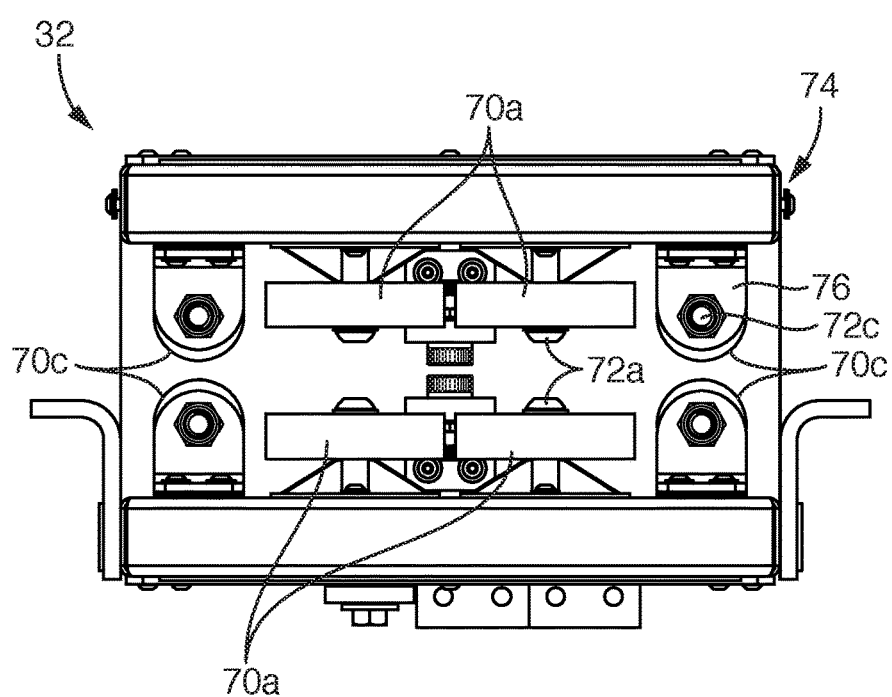
FIG. 20 is a top plan view thereof.

Referring to FIG. 17, while continuing to refer to FIGS. 14 through 34 and FIGS. 1 through 37 generally, an axial view or longitudinal end elevation view of one embodiment of a frame 74 of a trolley 30 illustrates an engagement arm 90 extending horizontally or laterally away from a central or vertical plane of symmetry 85 of the frame 74. One will see that an eye bolt 86 secures a connector 88 or link 88 that may then connect to a harness of a user.

Referring to FIGS. 18 through 23, while continuing to refer to FIGS. 14 through 34, and FIGS. 1 through 37 generally, a carrier trolley 32 may operate similarly to the carrier trolley 30 but on the lift track 28. Accordingly, a system of wheels 70 on brackets 76 connected to a frame 74 may operate similarly. However, a swing arm 92 is pivoted about an axle 93, such as a bolt 93 secured to the frame 74.

The lift trolley 32 may be a design to match a carrier trolley 30 in which a swing arm 92 engages a bar on a chain link. The swing arm 92 is free to move away from a backing element 94 or stop 94 that prevents motion in a reverse (whether that be forward or backward) in longitudinal direction 11*a*. The swing arm 92 may only swing in one direction, (e.g., forward). Thus, as an engagement arm 84 or a chain link protrusion may pass forward toward the end 95*a* of the trolley 32, the swing arm 92 is engaged by the engagement arm 84, or chain link bar or tab, thus pivoting about the axle 93, and permitting the engagement arm 84 and trolley 30 (or chain link bar) to pass. Upon passing by the trolley 30 and the engagement arm 84, the swing arm 92 now pivots toward the opposite end 95*b* of the lift trolley 32, stopping at the stop 94 from further movement rearward.

The stop 94 stabilizes the swing arm 92, thus allowing it to push against the engagement arm 84 with the force necessary to lift the trolley 30 and its rider up along the ramp portion 26 of the track 12. If the trolley 32 is acting as a carrier trolley it moves forward, the swing arm 92 lifts, the extension from a chain link engages it, and the trolley 30, 32 rises up the ramp. The swing arm 92 also acts as a ratchet against support stops along the track. A loss of power does not allow a cart 30 to retreat backward or downward.

Referring to FIGS. 20 through 23, while continuing to refer to FIGS. 14 through 34 specifically, and FIGS. 1 through 37 generally, other views of the lift trolley 32 illustrate the various components, and in particular, the wheels 70 operating on their axles 72, secured by or with brackets 76 to the frame 74.

Referring to FIGS. 24A through 26, a trolley wheel 70 may be mounted on an axle 72 that is itself eccentrically mounted by a tab 76 or bracket 76 to the frame 74 of a trolley 30. For example, in the illustrated embodiment, the axle 96 secures to the bracket 76, and may actually pass through the bracket 76, allowing the bracket 76 to rotate with the eccentric axle 72.

Figure 25:
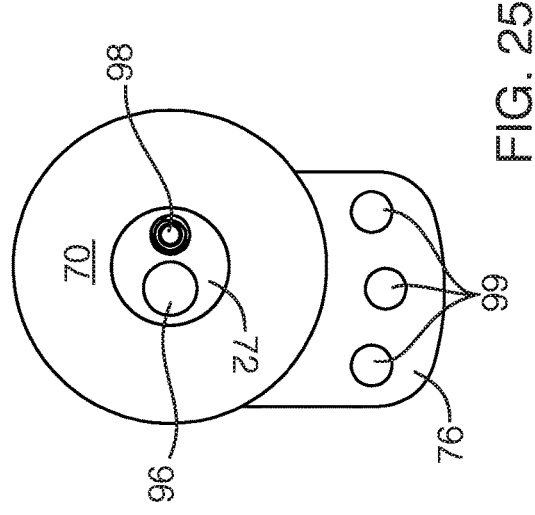
FIG. 25 is a side elevation view thereof.
Figure 26:
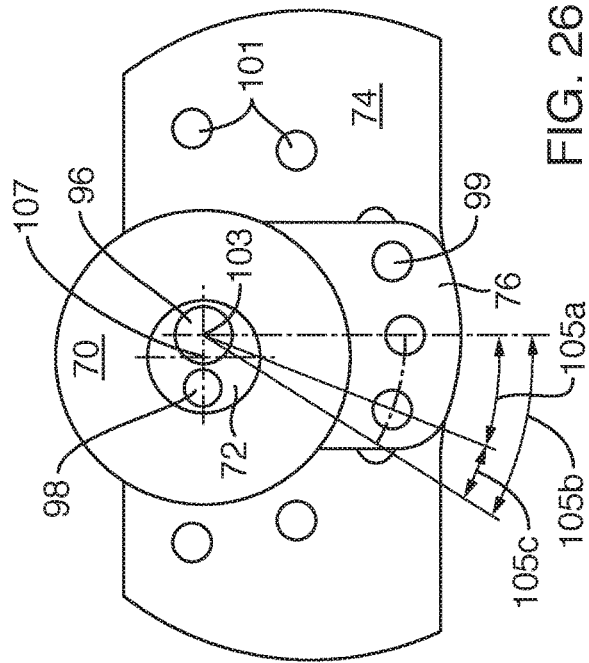
FIG. 26 is
Figure 24A:
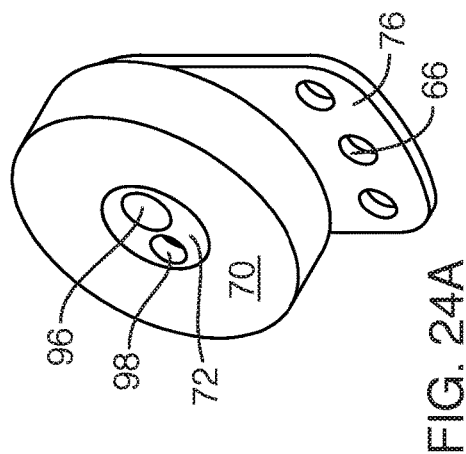
FIG. 24A is a perspective view of one embodiment of an adjustable axle for a wheel or roller on a trolley in accordance with the invention.
Figure 24B:
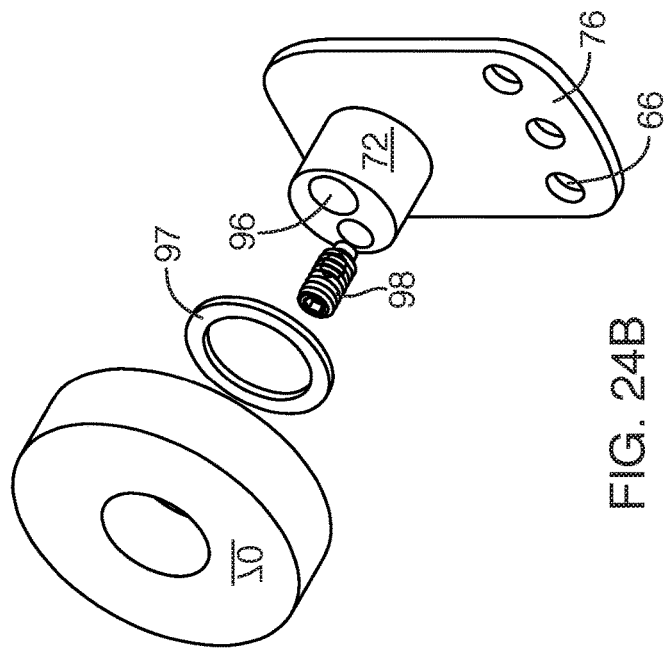
FIG. 24B is a perspective, exploded view thereof.
Figure 27:
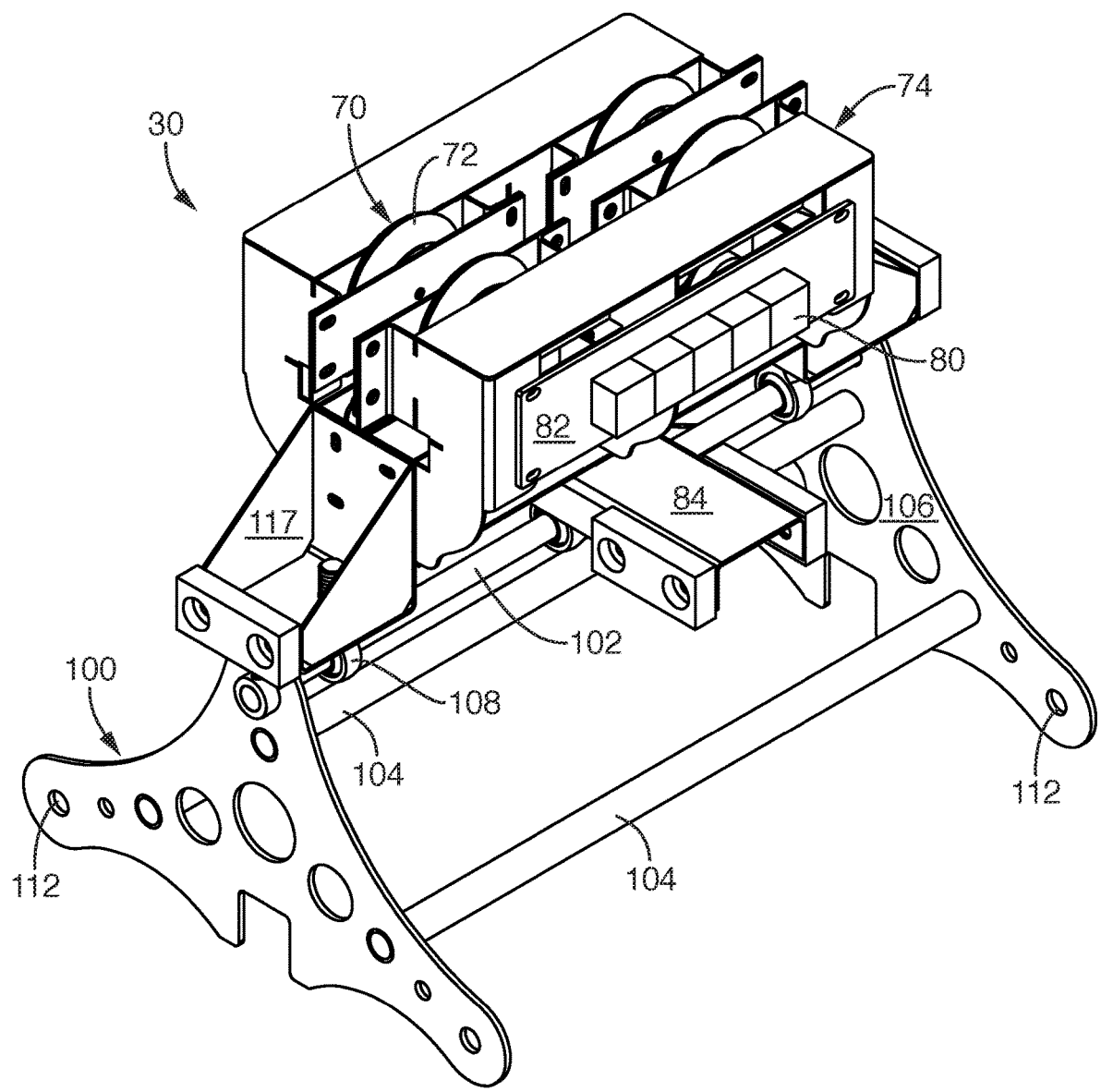
FIG. 27 is a perspective view of one embodiment of a trolley in accordance with the invention having certain structures, such as cosmetic coverings, guards, and a portion of the braking system removed or visibility of the illustrated components and assembly.
Figure 28:
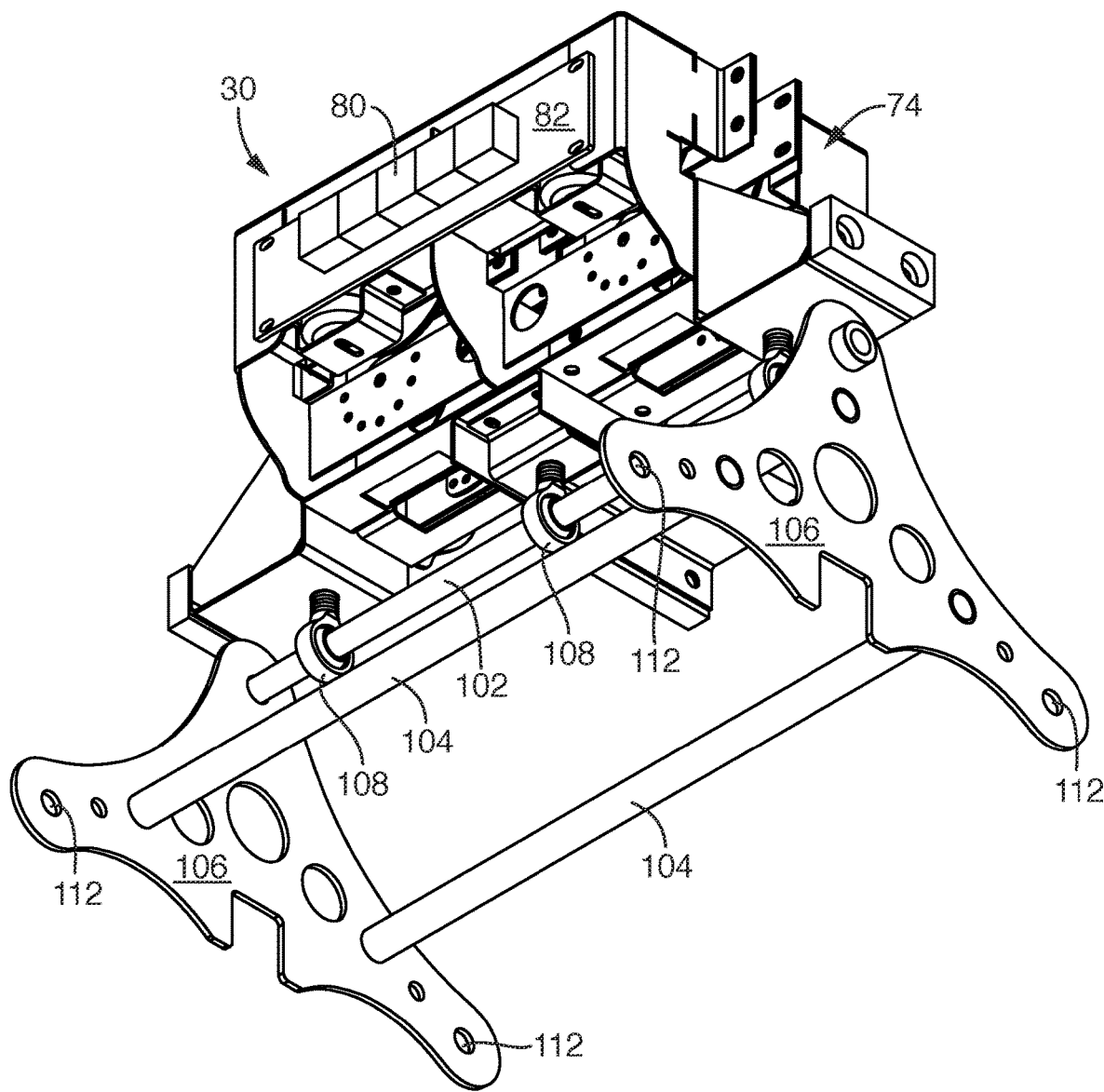
FIG. 28 is an underside perspective view thereof.
Figure 29:
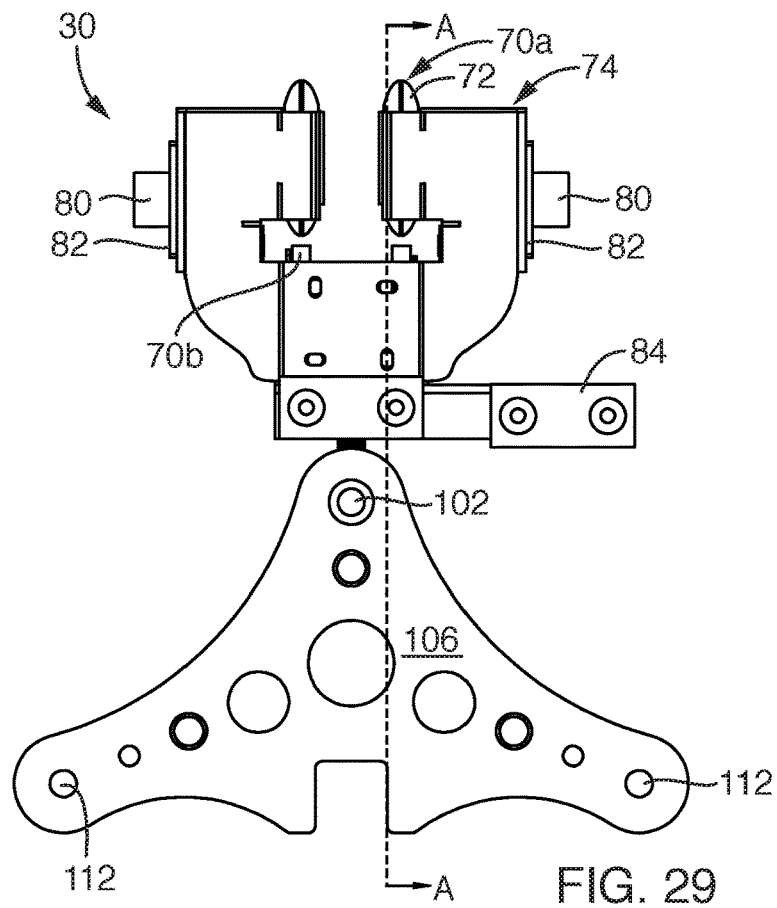
FIG. 29 is an end elevation view thereof.
Figure 30:
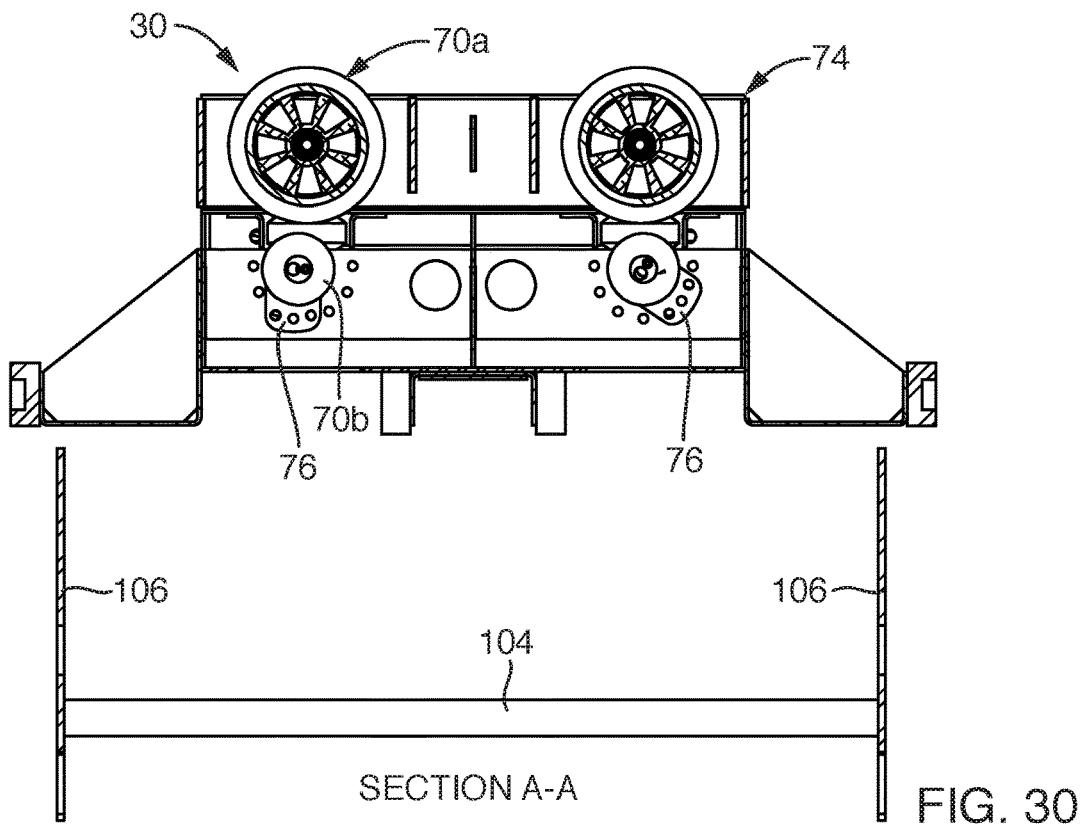
FIG. 30 is a cut away, cross-sectional, side elevation view thereof.
Figure 31A:
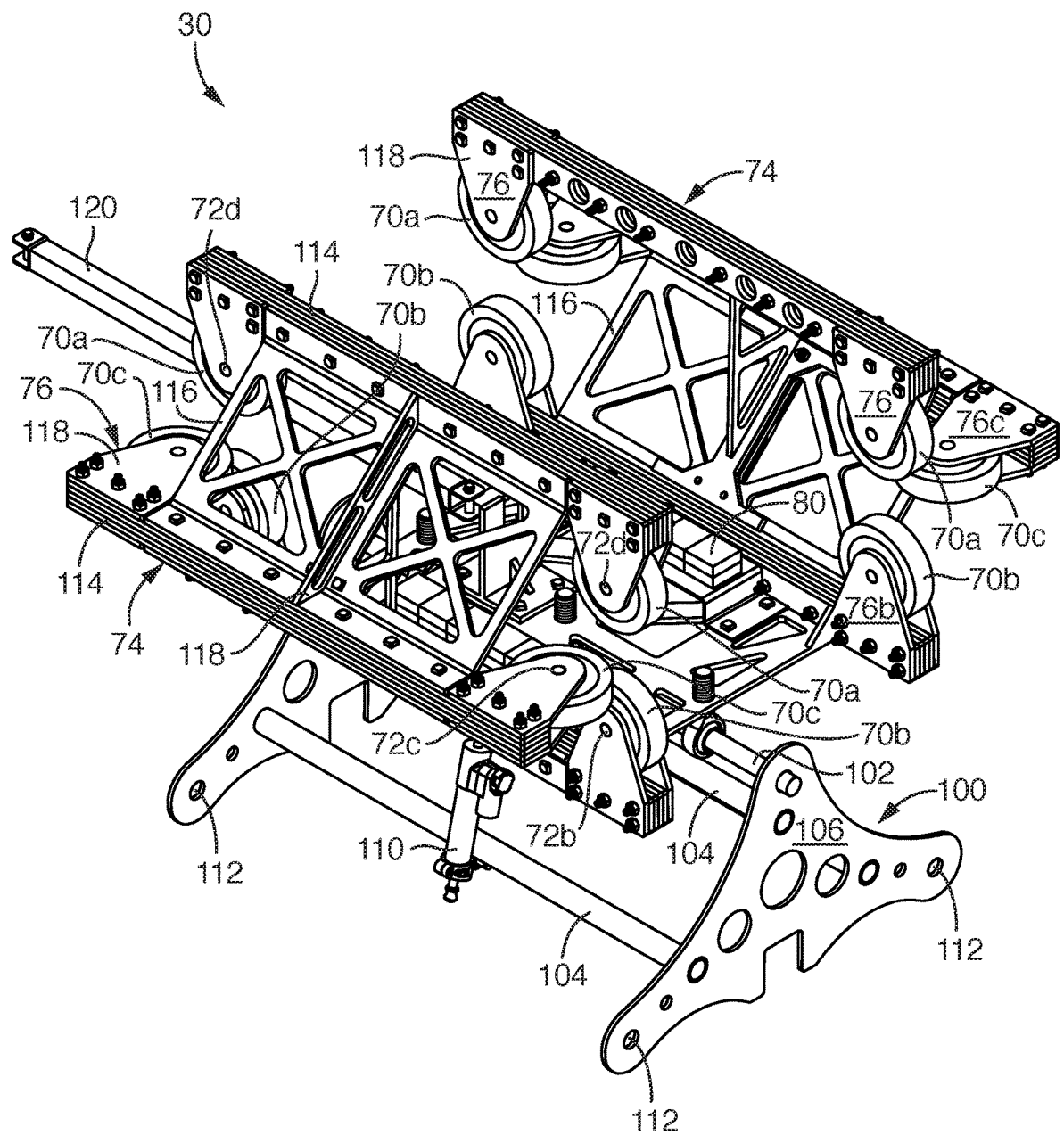
FIG. 31A is an upper, frontal, perspective view of an alternative embodiment of a trolley in accordance with the invention, configured to ride on a triple-tube, truss-type track or a horizontal flange of an I-beam in accordance with the invention.
Figure 31B:
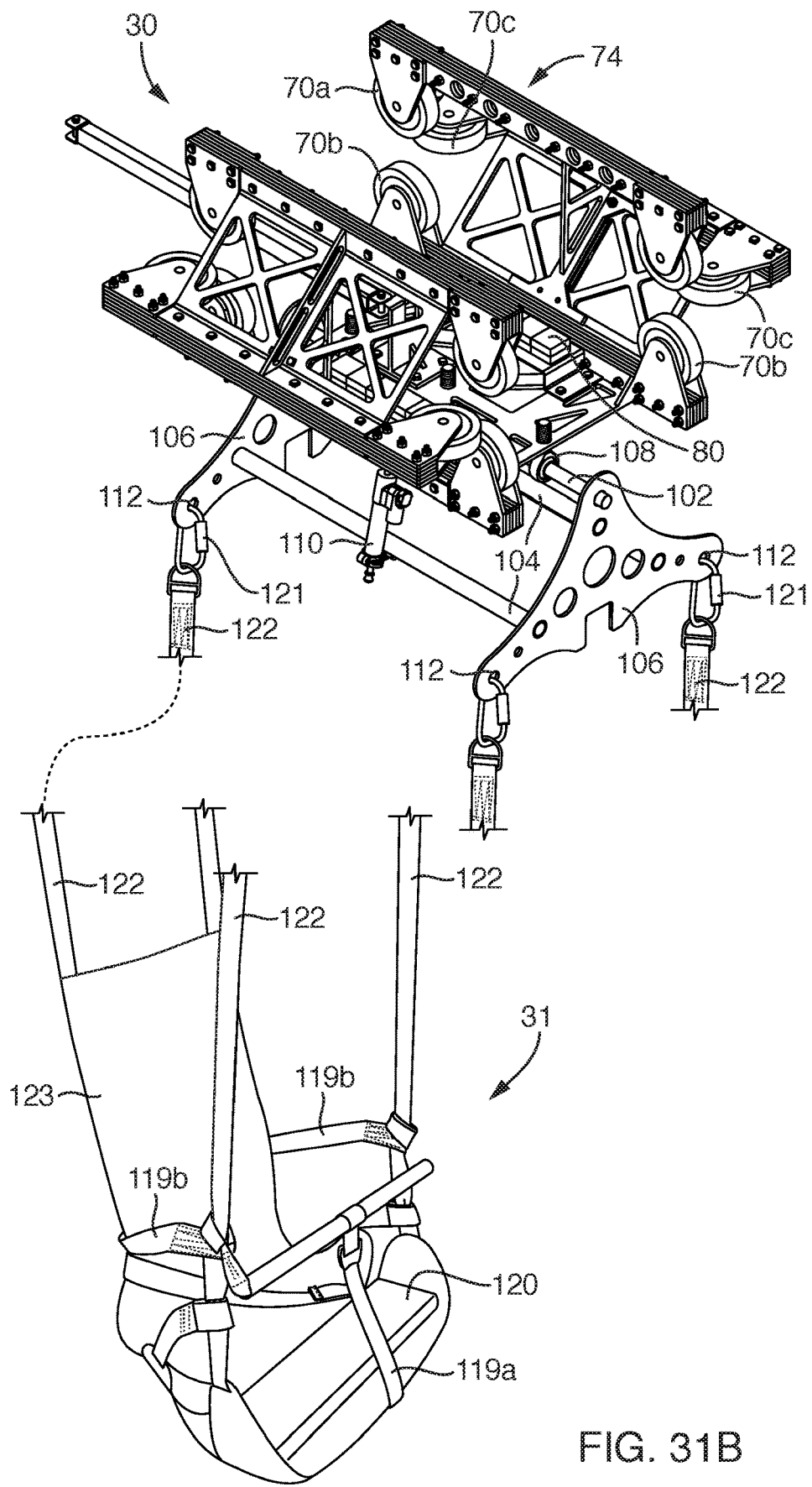
FIG. 31B is a frontal perspective view thereof from a slightly different angle.
Figure 32:
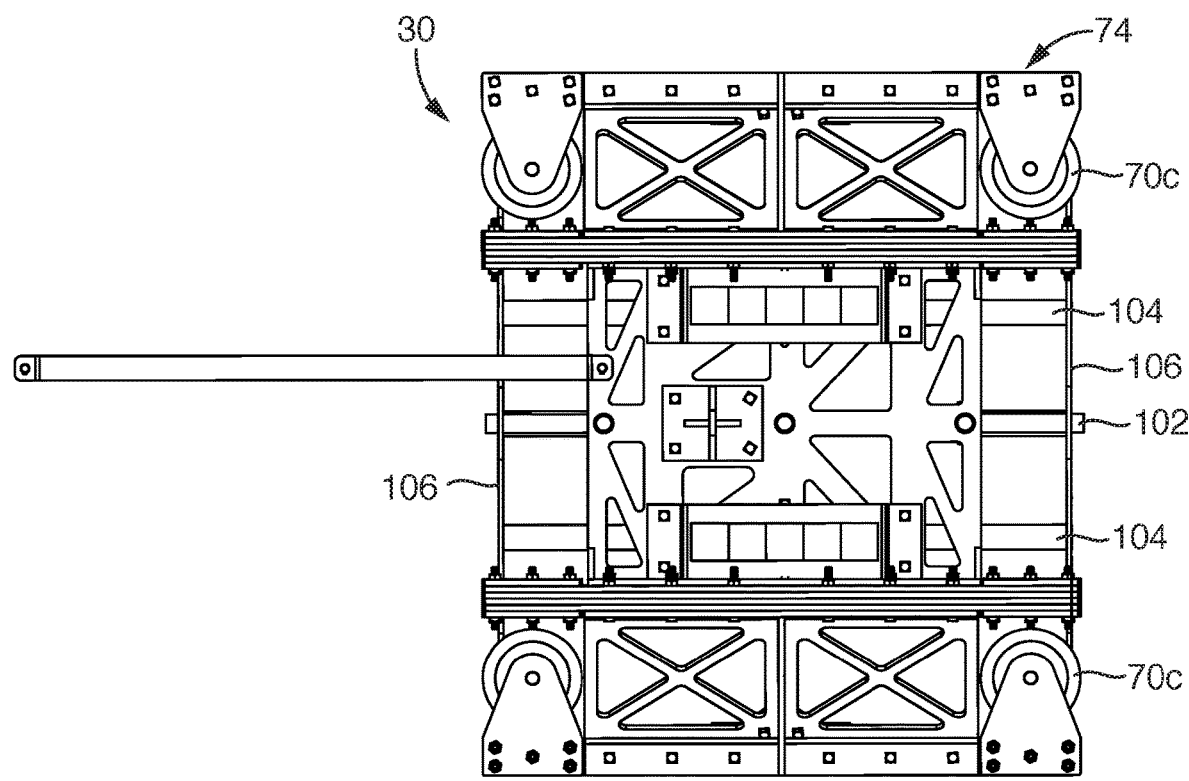
FIG. 32 is a top plan view thereof.
Figure 33:
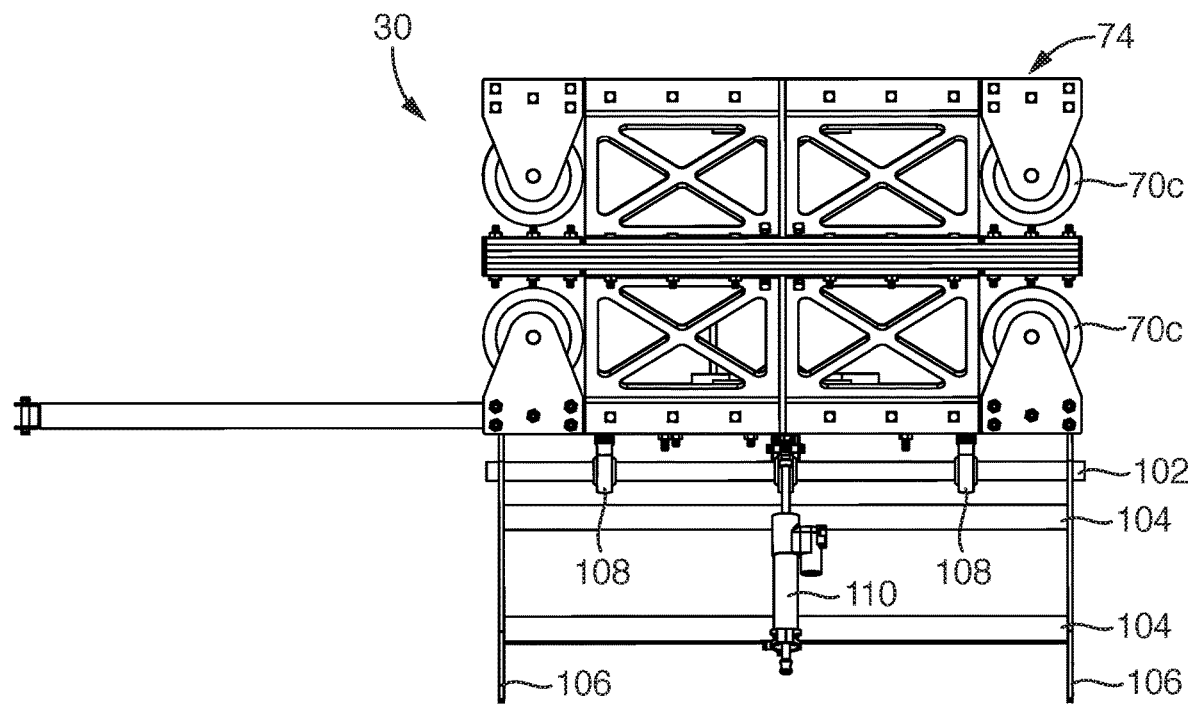
FIG. 33 is a side elevation view thereof.
Figure 34:
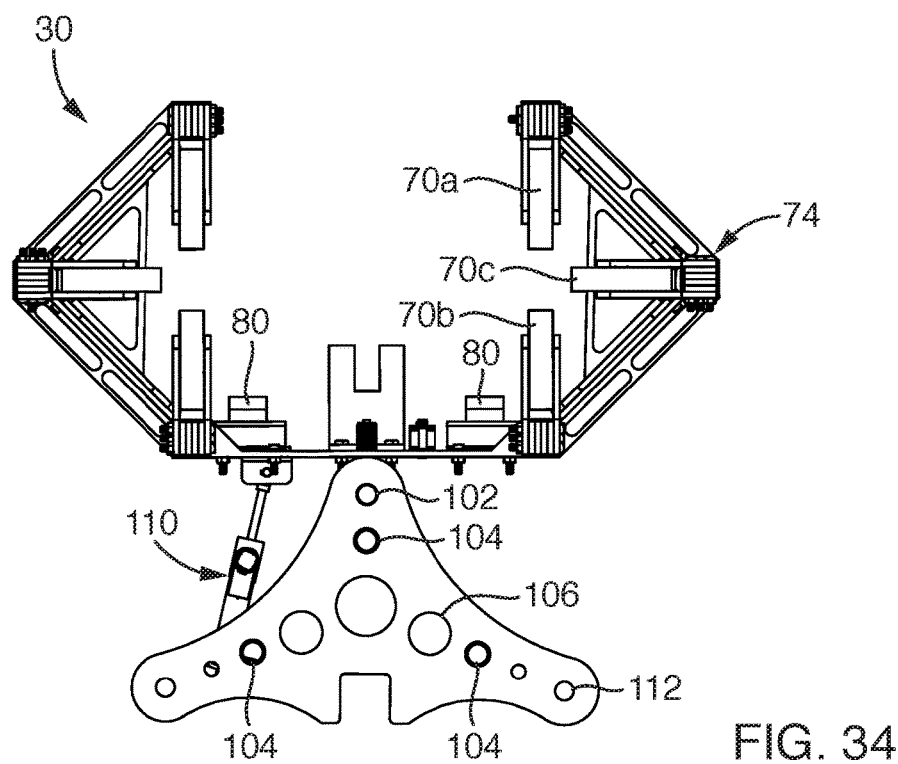
FIG. 34 is an end elevation view thereof.

Referring to FIG. 26 specifically, relative to FIGS. 24A, 24B, 25, and 30, adjustment of a wheel 70 and the clearance of that wheel 70 with respect to the rail 12 on which it rides may be done with a great degree of precision yet flexibility. By arranging a series of apertures 99 in the bracket 76 or tab 76, and another set of apertures 101 in the frame provides several incremental points of coincidence therebetween. A single fastener (e.g., pin, bolt, etc.) can be positioned to fix rotation, thus selecting a clearance.

The apertures 101 in the frame 74 of a trolley 30 are spaced apart from one another on an arc, a semicircle. That semicircle or arc is centered around the center point 103 or center line 103 passing through the axle 96. One will note that the apertures 99 and the tab 76, the apertures 101 in the frame 74, and the axle 72 about which the wheel 70 rotates all have the same center 103 of rotation. Thus, the axle 96 or fastener 96 about which the axle 72, the wheel 70, and the tab 76 pivot or rotate are all coincident, collinear, and so forth.

Meanwhile, the apertures 99 and the tab 76 in the apertures 101 in the frame 74 all center about the arc on which they are distributed. Each centers about that center line 103 or center point of the axle 96. Many alignment options are possible. Note that a movement (pivoting) of the tab 76 about the center line 103 moves the apertures 99 with respect to the apertures 101. The apertures 99 are separated by an angle 105a while the apertures 101 are separated by an angle 105b. Each incremental movement or pivoting of the tab 76 about the center line 103 rotates the eccentric axle 72 by some incremental angle 105c. This is required to obtain the next available alignment between an aperture 99 and an aperture 101. One will note that a bolt, pin, or some other fastener may be inserted, preventing further relative pivoting or rotation of the tab 76 with respect to the frame 74. A fastener may be passed through a pair of coincident apertures 99, 101 upon alignment therebetween.

By having some number (three in the illustration) of apertures 99 in the tab 76, and some other larger number over some larger arcuate angle of the distributing of apertures 101, an interesting phenomenon occurs. The next available incremental angle 105c is simply the angular distance or arc length between the next available alignment of an aperture 99 in the tab 76, and the next available aperture 101 in the frame 74. An Analysis of how these angles 105a, 105b, 105c are determined, will illustrate how adjustments may be made on a Vernier basis. That is, the next available incremental arc 105c need not be the one used. Rather, one may adjust the tab 76 to the nearest, desired, suitable, available setting. In this way, the tab 76 may be set at any one of the available matches between apertures 99 and apertures 101.

A single bolt or other fasteners all that is required in the paired apertures 99, 101 aligned at that position. Accordingly, the discrete distribution of the apertures 99, and their relative angular displacement 105a, and a similar distribution of the apertures 101 at a different angular distribution 105b provides numerous, precise, discrete adjustment locations.

The significance or purpose of the adjustability between the tab 76 and the frame 74 is to provide slight motion or rotation (pivoting) by the eccentric axle 72 about its axle 96. As the eccentric axle 72 pivots around the fixed axle 96, the centroid 107 or center 107 of area of the axle 72 moves. In short, the centroid 107 or center 107 of the circle 72 that is the axle 72, pivots about the center line 103 of the axle 96.

Thus, as the tab 76 rotates about the center line 103, the center 107 of the eccentric axle 72 moves up or down with respect to the frame 74. In this way, the wheel 70 is closer or farther from the rail 12 (if the wheel 70 is in idler 70). On the contrary, if the wheel 70 being adjusted by the tab 76 is a carrier 70a, then it is the frame 74 that is lifted or dropped relative to the rail 12 on which the wheel 70 runs.

Typically, it is only necessary to have adjustability for the idlers 70b operating underneath the rail 12 as keepers, to prevent the trolley 30 from jumping off the rail 12. On the other hand, it is also much simpler to have a single set of wheels 70 that are adjustable, and not the carrier wheels 70a.

Referring to FIGS. 24 through 26, while continuing to refer generally to FIGS. 1 through 37, an adjustability may be built into the brackets 76 supporting various wheels 70. This is most valuable for idlers 70b and guides 70c. For example, an axle 72 may actually be an eccentric 72 fastened by a pivot 96 or secondary axle 96 about which the axle 72 may be temporarily rotated eccentrically.

The axle 96 is not centered about a central axis 95 or axis of rotation 95 of the wheel 70. Rather, the axle 72 itself has its own axles 96, with a new center of rotation, eccentric with respect to the rotation of the wheel 70 itself. One may rotate the axle 72 and bracket 76 together about the internal axle 96. One may fix that position of the tab 76 or bracket 76 with respect to the frame 74 mounting the axle 96 by threading a set screw 98 from and through the axle 96 to which it is fixed, against the frame 74. This fixes the particular alignment and positioning of the wheel 70 with respect to the track 12. Thus, clearances with respect to the track 12 and the various wheels 70, may be maintained for smooth travel, minimum noise, and safety by this mechanism.

Various apertures 99 may be provided in the bracket 76 in order to secure to the frame 74. Any or all of the wheels 70 may be subject to a mount system in accordance herewith.

In the illustrated embodiment, a shim 97 may reduce friction between the bracket 76 and the wheel 70 rotating about the axle 72. The wheel 70 may have a bearing incorporated as part of the axle 72, as part of the wheel 70, or positioned therebetween. Thus, rotating friction may be handled by a bushing, bearing, journal, lubricant, combination, or the like. The face of the bracket 76 or surface against which the wheels 70 rides, will not see significant force. Nevertheless, a shim 97 or washer 97 may provide standoff distance of the wheel 70 from the brackets 76, while also reducing friction therebetween.

Referring to FIGS. 28 through 34 particularly, as well as FIGS. 1 through 37 generally, various embodiments of a trolley 30 may include below a frame 74 of the trolley 30 an axle 102 connected in rigid-body relation to a yoke 100. The yoke 100 may be an assembly 100 in which spacers 104 extend between end plates 106. The end plates 106 may be in a triangular shape in which, at one upper vertex, eye blocks 108 or eye bearings 108 provide a pivotable connection to the axle 102. The axle 102 may typically rotate with respect to the eye blocks 108 or eye bearings 108 in order to pivot laterally the harness (seat) 120 suspended under the yoke assembly 100. Thus, the end plates 106, although longitudinally spaced from one another by the spacers 104, may act in rigid body motion.

A damper 110 may connect between the frame 74 and the yoke assembly 100 in order to dampen the relative motion between the frame 74 and the yoke assembly 100. The damper 110 may operate as a dashpot, as that term is recognized in mechanics, machinery, or engineering parlance. A dashpot is typically a container (e.g., cylinder) of viscous liquid contained in a vessel through which a perforated plunger is driven by an actuator rod. Alternatively, a piston may move liquid through any restricted path (even going outside the container) between opposite faces of the piston. Sometimes a surface may simply pass through an open body of viscous liquid.

The friction drag of the liquid passing through small apertures provides damping proportional to the square of velocity of that liquid passing through. Thus, lateral 13b motion of a rider in a harness 31 is dampened by a damper 110 modulating or moderating the resistance to relative movement of the yoke assembly 100 with respect to the frame 74 of the trolley 30 traveling along a track 12. Resistance may be tuned (adjusted) to control the number of oscillations permitted back and forth.

In operation, a framing system 15 may support itself and a track 12. A suspended track 20 allows trolleys 30 with seats 120 to travel along below the track 12. A framing system 15 may allow a variety of trolleys 30 and seats 120, including soft, flexible seats or hard seats, harnesses, fabric seats, or enclosures on carts. A system 10 may include a control or damper. This may be tuned to permit swaying by a rider on turns. Thus, a user may experience three degrees of freedom of motion in translation and once of rotation at once while in the seat, although the rail and the framing system need not progress in more than two directions at one time. "Roll" may be controlled by tuning the damping of a trolley 30.

A rider or user may be suspended from a cart 30 following the rail 12. A rider seat 120 and straps 122 may pivot with the yoke 100 around an axle 102. The damper 110 may adjust to damp optimally (critical damping) limiting that swaying to a single cycle or half cycle. This prevents a rider from contacting structures 15 or another rider. On the other hand it provides a third degree of freedom of motion (rotation, swinging laterally) enhancing the sped and momentum.

The path of the rail 12 need not rotate. It may turn without dropping and drop without turning. Also, there may be limited (e.g., six inch) drop along a specified straightaway, which may be near a landing zone or finishing area. If the rail 12 were curved laterally 13b with a comparatively heavy rider, such a rider may be swinging heavily. Therefore, the damper 110 may be adjusted (tuned). Tuning a damper is taught in any instruction manual for the ordinary mechanic who installs or adjusts pendulous masses. The theory and equations are available in any text on mechanics dynamics.

For example, using a 250 pound weight, one may tune the damper 110 to achieve lateral 13b sway damped to an acceptable level, typically no more than a single cycle of motion. It is acceptable, even desirable, to leave some sway in the ride, to heighten excitement and provide a natural dynamic motion on turns.

The damping system 110 may use hydraulic dampers 110 such as automotive steering systems use to reduce oscillations (shimmy). They are adjusted (tuned it) to critically damp about a 250 pound rider. This adjustment may be calculated analytically, but is easily made experimentally using a weight in a seat 120 because of the pendulum action.

The damper 110 may be adjusted and tuned in order to prevent oscillation, reduce any abruptness of motion on turns, or the like. Nevertheless, for most riders, the lateral 13b movement of the harness seat 120 below the trolley 30 on corners is a desirable part of the ride. Accordingly, this may be tuned according to the principles of damping of oscillations as taught in any textbook on dynamics and damping systems.

A pendulum operates the same regardless of the weight, notwithstanding one may have to ignore air, drag. In the pendulum equation, air drag does actually have an effect. Within the scope of a system 10, one may limit lateral swing back and forth to not be excessive. A trolley 30 may be tuned for drag but theoretically works for all riders. Timing can be tuned for the track, its decline, and its curves.

Typically, the end plates 106 are provided with apertures 112 through which fasteners 121 such as carabiners 121 may connect to straps 122, slings 122, or the like supporting a chair 120, seat 120, or harness 120 for a user. A chair 120, harness 120, gondola 120, or the like may suspend from slings 122 (fabric web strips 120) connected by carabiners 121 or other connectors 121 passed through the apertures 112 of the end plates 106.

The harness system 31, being suspended below the yoke 100 permits independence of motion of a rider or patron in a lateral direction 13b, and moreover in a rotating, "roll" direction. This improves the ride, but made be damped by the damper 110. A damper 110 may adjust to modify, reduce, or preclude oscillation. It may otherwise tune the rolling motion or lateral 13b swinging of the harness system 31 and yoke 100 together.

By using the connectors 121 such as carabiners 121 a certain degree of freedom is permitted between the actual harness seat 120 itself and the yokes 100. Nevertheless, due to the use of four straps 122, any relative movement of a rider and harness seat 120 with respect to the yokes 100 is unusual, short distanced, and very temporary. In general, relative motion of the yoke 100 with respect to the trolley 30 supporting the yokes 100 is freely permitted under the control of the damper 110 and its resistance setting (resistance to motion).

Four points of connection may typically stabilize the chair 120 of a rider to resist rotation about a vertical axis 13c (yaw), lateral axis 13b (pitch), and longitudinal axis 13a (roll) with respect to the yoke 100 itself. Inordinate swinging forward or backward is nearly impossible. As a practical matter, the axle 102 accommodates a desired amount of lateral 13b swinging (resulting in a rolling motion) at corners (turns) along the track 12. The yoke assembly 100 may pivot to accommodate the force vectors acting. The straps 122 fix the seat 120 laterally to the yoke 100. The damper 110 is tuned to damp out excessive oscillations laterally while still permitting the "rolling" motion of swinging out on turns of the track 12.

It has been found that a seat 120 formed of a fabric, mesh, or the like serves much better than would a solid seat 120. The freedom of motion and the comfort of the rider more closely approximates a zip line. In fact, in certain embodiments, the damper 110 may be reduced in effect (damping force reduced) in order to provide a more "wild" ride similar to what a zip line would provide. In a more stringently damped configuration, the damper 110 may reduce the trolley 30 motion to more closely approximate that of a rail-based, conventional, roller coaster.

Referring to FIGS. 31A, 31B, and 32 through 34, as well as FIGS. 1 through 37 generally, an alternative embodiment of a trolley 30 may be configured to operate on the track 12 represented by either an I-beam or the lower tubes 64 of the truss 60. In the illustrated embodiment, the frame 74 is constructed of layers of a material, typically a steel of suitable type. This particular embodiment may be manufactured by assembling layers of steel. Layers may be laminated together by bolting or riveting.

Fastening between the principal beams 114 and angled struts 116 may be accommodated by making the struts 116 to have ends that fit onto or into a stackable beam 114. Thus, material integrity is sustained by the continuity of material without fasteners, welds, or the like therebetween. In addition, gussets 117 may be positioned to maintain the angles between the beams 114 and the struts 116. The struts 116 may actually be plates that have been bent to be a part of the stack up of the beam 114. For example, plates 118 may actually form the brackets 76 in which the wheels 70 are contained.

Again, in this embodiment, the damper 110 is clearly shown. Moreover, the structure of the yoke assembly 100 is a somewhat triangulated connection to the end plates 106 and spacers 104, to act in rigid body motion. The axle 102 rotating in the eye blocks 108 or eye bearings 108 may pivot with respect to the frame 74, under the influence of damping by the damper 110 modulating or damping that motion.

A standoff 120 may secure rigidly or non rigidly to the frame 74. The standoff 120 may secure between adjacent trolleys 30. The standoff 120 simply maintains distance and longitudinal direction between two trolleys 30. Meanwhile, the actual alignment of the trolleys 30 on the track 12 is provided by the assembly of wheels 70 or rollers 70 in operation.

In the illustrated embodiment, the carriers 70a or carrier wheels 70a ride on top of the bottom tubes 64 of the truss 60 or flange of an I-beam 12. Nevertheless, the axles 72a thereof need not be exactly horizontal on tubes 64. Force vectors that are not exactly vertical may support the trolley 30 vertically 13c on the track 12, even if the exact angle of the axle 72 is not horizontal. Nevertheless, in the illustrated embodiment, the carriers 70a rotate on a horizontal axle 72a, as do the idlers 70b on their axles 72b. Meanwhile, the guides 70c operate or rotate about vertical axes 72c to maintain lateral 13b tracking of the trolley 30 along the track 12.

The cart 30 is relatively sophisticated and expensive, more than just a conventional trolley. It has the main housing 74 or frame 74 that carries the rollers 70, both lateral stabilizers 70c and vertical load 29 carriers 70a. Outside are the neodymium magnets 80 which operate in an eddy current braking system 29 under the Lorenz effect (a moving magnetic field drives a current, a moving current carrier creates a magnetic field).

The trolley wheels 70 or rollers 70 may act as a suspension system. To a certain extent, when rollers 70 or wheels 70 are formed of a comparatively softer rubber, or a composite wheel and tire, a certain compressibility may be available on each of the rollers 70 when under load. When a wheel 70 compresses, it may operate as a suspension, as a spring, and also as a modifier of tolerances.

For example, the wheels 70 may actually be under compression at all times, causing certain frictional losses in rolling, but providing a tighter tolerance or closer tolerance between the wheels 70 and the bottom flange 17a of a track 12. Moreover, even if tolerances are set to provide open gaps between, for example, idlers 70b below or guides 70c beside a track 12, and the track 12 itself.

On inclines and declines and possibly on turns, the use of a compressible wheel 70 provides trolleys 30 that proceed through bends sideways 13b, and up and down 13c. Similarly, the guides 70c may provide a certain amount of give in compression in order to accommodate turns in a lateral direction 13b of the track 12. With solid metal wheels, additional suspension systems (e.g., springs) would be required for a smoother, quieter ride.

Referring back to FIG. 31B, again, a harness assembly 31 or seat assembly 31 may include its namesake the seat portion 120 or simply straps of a harness. It is typically preferred for throughput to have a seat portion 120 and back portion 123. Meanwhile, these are both suspended by the straps 122 or slings 122 extending a suitable length from fasteners 121 such as carabiners 121 connected to the apertures 112 in the end plates 106 of the yoke 100.

In the illustrated embodiment, a safety bar is somewhat loosely swung from the front straps 122 to be easily lifted above a rider, and then snapped by a buckle into a center strap. In this way, a rider may be rapidly loaded and secured by simply lifting the safety crossbar overhead while loading the rider, then dropping the crossbar to the rider's lap, where it will snap by a buckle shared with the central seat strap 119a. Meanwhile, other safety straps 110b may be placed elsewhere as mechanisms for support for the seat 120, the back 123 or simply for restraining smaller riders against escape or falling from the harness system 31. Thus, although a climbing harness represented only by leg straps and a waist belt connected by slings is possible, comfort, safety, ease of loading and unloading, and so forth are all expedited by a harness assembly 31 or seat assembly 31 as illustrated.

Figure 35:
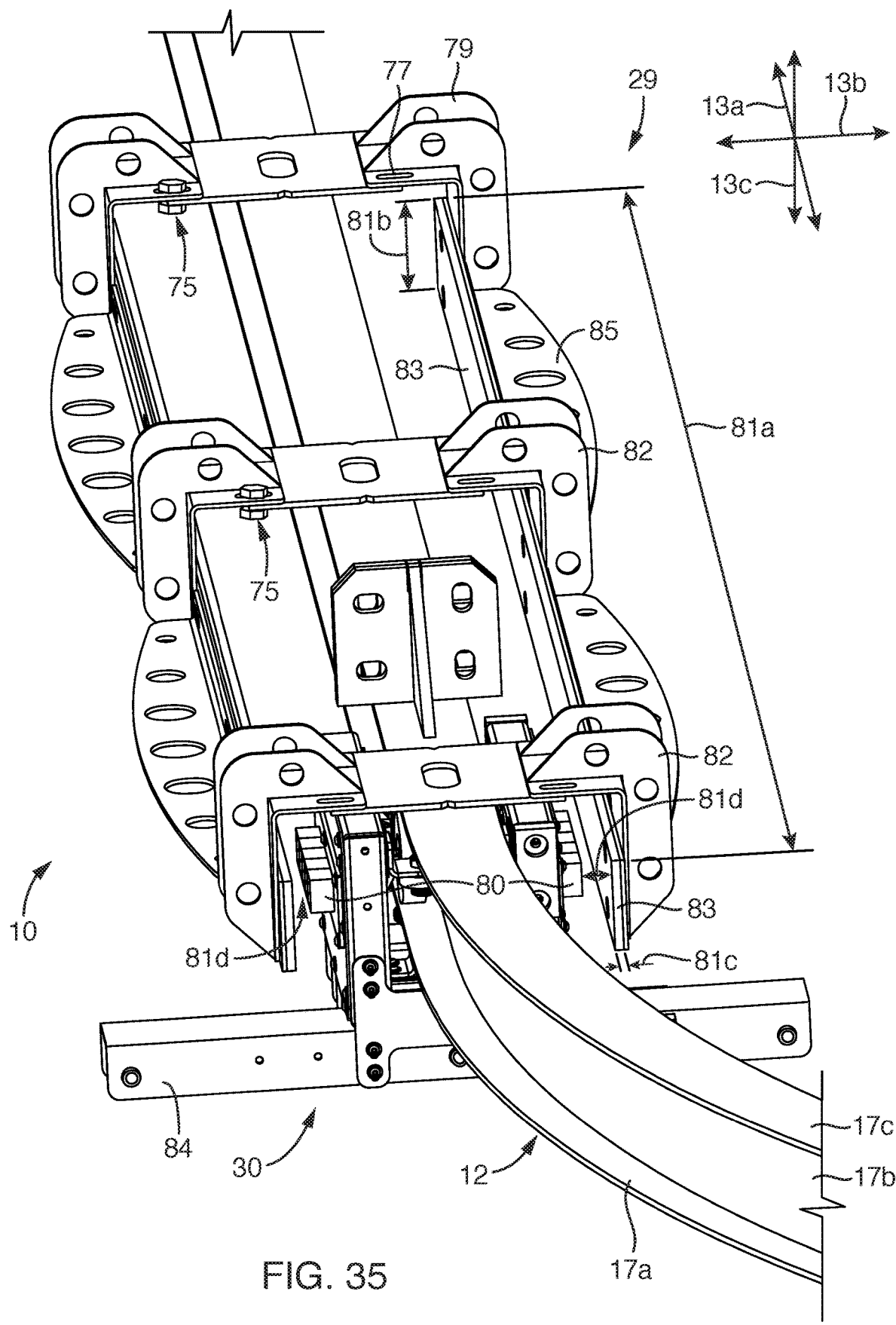
FIG. 35 is a perspective view of a trolley passing through an electromagnetic braking system fixed to the rail (a segment of which is shown) on which the trolley is traveling.

Referring to FIG. 35, an eddy current braking system 29 (ECBS 29) may include brackets 79 connecting to a rail 12 of a trolley system in accordance with the invention. For example, in the illustrated embodiment, magnets 80 are mounted on a plate 82 secured to a trolley 30. As a practical matter, the plates 82 may be secured to the trolley 30 or to the brackets 79 on the rail 12.

That is, a current plate 83 is designed to have a length 81a, a width 81b or height 81b (intra vertical plane as illustrated), and a thickness 81c. Meanwhile, the current plate 83 may be spaced away from the magnets 80 some clearance distance 81d or clearance 81d. For convenience, consider that the distance 81a or length 81a over which braking will occur may be several feet. Five feet has been found a sufficient distance suitable for bringing a rider to a halt at a comfortable deceleration rate.

However, the plates 83 or current plates 83 illustrated as flanking the rail 12 on both sides or the trolley 30 on both sides could reverse location with the magnets 80 to the same effect. Nevertheless, inasmuch as the length 81a may be selected to be comparatively long (compared to magnets 80 of about an inch cubed, 2.54 cm), it makes more sense for the trolley 30 to carry the magnets 80 secured to and by the mounting plate 82 on the trolley 30.

In certain embodiments, the distance 81d or clearance 81d may be adjustable. Magnetic forces tend to decrease as the square of distance 81d or clearance 81d between the magnets 80 and the current plate 83. So a slide adjustment of the clearance 81d may be very useful. Moreover, in order to further smooth or slowly introduce braking forces on the trolley 30, the clearance 81*d* itself may vary from a greater to a lesser distance 81*d* between the magnets 80 and the current plate 83.

Accordingly, the brackets 79 may be provided with slots 77 through which bolts 75 may be placed. Thus, the clearance 81*d* variation along the plate 83 may be adjusted. Typically, if the current plate 83 is solid then any clearance 81*d* variation will necessarily be linear from one end of the plate 83 to the other.

Also, it is illustrated to have two sets of magnets 80 and two current plates 83. This is not necessarily so. A single current plate 83 may be adequate. Nevertheless, in order to balance forces applied to both sides of the trolley 30, and reduce any twist, torque, or couple in the yaw direction (rotating about a vertical axis 13*ac*), the balancing of forces is desirable. Moreover, undue wear or stress may occur in certain of the wheels 70, such as the lateral guides 70*c*.

Although not illustrated, for clarity, a bolt 75 may be secured into each slot 77 of a bracket 76. Likewise, the framing 85 that supports the current plate 83 may or may not be a part of the current plate 83.

For example, if the framing 85 is conducting and is electrically connected to the current plate 83, then eddy currents may circulate within the framing 85. On the other hand, insulation may be placed between the current plate 83 and the frame 85 to preclude current circulation through the frame 85. Similarly, the frame 85 may be made of a dielectric material. Nevertheless, considering the braking forces, a robust construction has demonstrated that framing 85 of metal, such as steel or aluminum has served well.

It is worth noting that the engagement distance between the plate 83 and the magnets 80 affects the amount of eddy current generation within the current plates 83. Accordingly, the brackets 79 may have slots 77 with bolts 75 to adjust laterally 13*b* the framing 85 and current plates 83.

Similar slots 77 may be placed on vertical surfaces of the brackets 79 to provide vertical 13*c* or transverse 13*c* adjustment of the current plates 83 with respect to the magnets 80 on the trolley 30. Thus, the amount of vertical 13*c* engagement distance or overlap may be adjusted between the magnets 80 and the current plate 83. In the illustrated embodiment, the magnets 80 are illustrated as positioned approximately parallel to a center line proceeding longitudinally 13*a* along the center of the width 81*b* of the current plates 83. In alternative adjustments, the magnets 80 may actually extend out over the edges of that width 81*b* (vertically oriented, therefore height may be used to describe this dimension 81*b*), thus reducing the effective magnetic engagement between the magnets 80 and the current plate 83.

An eddy current braking system 29 (ECBS 29) may include a bracket 82 (plate 82) under (or behind) the magnets 80. Another bracket 79 connects the "current plate" 83 to the rail 12 or track 12 by adjustment bolts 75 allowing lateral adjustment of clearance 81*d* between magnets 80 and the "current plate" 83. The current plate 83 may be about three inches in height 81*b*, five feet in length 81*a*, and may include a thickness 81*c* of about ⅜ inch (1 cm). An aluminum plate may be tapered and may have an offset or clearance between it and the magnets 80 of about 2 inch.

The ECBS 29 may have a clearance 81*d* between magnets 80 and a current plate 83 out to an inch or more and can still have a braking effect because of the strength of the magnets. The clearance 81*d* may be adjusted down all the way to ⅛ inch (3 mm) or less. Moreover, the clearance 81*d* may taper it so the different weights of riders would slow at similar rates and stop in different distances or the same distance with different forces.

A combination of factors may be used in engineering the eddy current braking system 29. For example, a downhill slope of the rail 12 should be about four degrees, because the ECBS 29 only generates magnetic braking forces when the trolley 30 is in motion, and is velocity dependent. So, a downhill slope assures that all riders or users are going to continue moving to the end. They will each slow down to the same slow constant speed.

The ECBS 29 may be a long linear system. As a trolley 30 enters a braking region, it can engage the magnets 80 and plate 83. Clearance 81*d* may be an inch, tapering and then down to approximately ⅛ inch (3 mm) or less. That creates a changing braking force depending on the relative linear position of the trolley 30 with respect to the ECBS 29 region at any given moment. One reason this is helpful is that the light braking force allows comparatively light riders to come in and experience an acceptable deceleration force. Mechanical braking does not automatically adjust so.

In one embodiment, magnets 80 and plates 83 may become closer and closer together along the longitudinal direction 13*a*. Any rider or user who passes that ECBS 29 location at a comparatively higher speed gets a comparatively higher force applied. A rider or user may naturally push farther and farther into the ECBS 29 depending on their weight and the ECBS 29 may assist such regulation by including the modest rate of elevation 13*c* decline at the end.

The system 10 may still include some energy recovery from elevation change of the trolley 30. The ECBS 29 need not stop a rider fully at any given point. Rather, users or riders may stop at the same spot but will slow down due to a force characteristic of their weight. The system 10 is safe and need not include anything physically touching the rider or trolley 30.

Any suitable magnet 80 may be used in the ECBS 29. Also, plates 83 and magnets 80 may switch places. In one embodiment, the magnets 80 may be neodymium cobalt magnets 80. Other suitable magnets 80 may include a samarium-cobalt, rare-earths, electro-magnets 80, and even aluminum-nickel-cobalt.

One may accurately predict how the brakes will respond to the entire range of riders. However, there are sometimes quirks discovered on site that make a pre-determined braking scheme less than optimal. Before use of the damping system, one may also add in braking sections to slow carts down before they go into a corner, which keeps the amount of lateral swing down. This may usually be empirically determined by feel, trial and error, analysis, or some combination of methods and adjustment. Damping is preferably tuned so it is biased toward heavier riders. It is more comfortable to over-damp the system for light people than it is to under-damp it for heavier, and the difference in response between the weights is small, as discussed above with respect to pendulum and drag theory.

Again, speed control of a rider in a conventional roller coaster is done by selecting the angle of incline and the angle of decline along a track 12 associated therewith. Similarly, the track 12 may be bent in a transverse (vertical) direction 13*c* to replicate or mimic a roller coaster that has a continuing series of decreasing maximum altitudes and corresponding descents.

Nevertheless, in certain embodiments, the track 12 may continually descend once a trolley 30 is released from the lift system 24. Accordingly, it may be beneficial or desirable to put periodic braking along the rail 12 in order to modify speed appropriately. This may be done by adding an ECBS 29 of a suitable length at any particular point along the track 12. This may typically occur just prior to particularly sharp corners, or the like. It will necessarily occur at the end of the ride.

In the discussion of the ECBS 29, it was pointed out that the current plate 83 is set at a clearance distance 81d away from the magnets 80 on the trolley 30. Of course, the positions may be reversed, but space tends to militate in favor of this particular configuration. Accordingly, the clearance 81d may change in a lateral direction 13b with progress in a longitudinal direction 13a of a trolley 30 along the track 12.

That clearance distance 81d may actually be actively controlled by moving the current plates 83 toward or away from the magnets 80 of the trolley 30, within certain limits. The braking system (ECBS 29) may be rendered (smart) by actively measuring by a sensor a patrons' speed at some location. A simple set of light sensors indicating position, and timer permit speed to be calculated using a time clock. Altering the clearance 81d may adjust the brakes according to the speed of the particular trolley 30.

The system 29 may also be modified by weighing a patron and trolley 30 on a particular section of track 12 provided with sensors for the purpose. Many types of sensors exist, including strain gauges, scales, separable platens supported on springs and provided with transducers, or the like.

Weighing a patron and trolley 30, then comparing a velocity and change in velocity, may provide for a computerized calculation of braking variables. Control may be the engagement alignment in a vertical direction 13c between the magnets 80 and the current plate 83. It may be the engagement distance 81d or clearance 81d between the current plant 83 and the magnets 80. It may be both. Thus, weight may be measured, and communicated to a processor for modifying the brakes or accelerators along the track 12 according to anticipation of that particular patron arriving at a particular location on the track 12.

For particularly long spans, the ramp portion 26 may be comparatively longer, or may be done in stages, including a first ramp upward, followed by leveling out and then a subsequent ramping portion 26.

Sensors to detect position, weight, speed, and the like may be installed along the track in order to assure no interference exists between riders. That is, to the extent that different speeds are calculated, permitted, or simply occur between adjacent riders, a set of sensors detecting positions installed in order to automatically adjust braking, or the like, in order to slow down when patrons separate their trolley 30 from a previous or subsequent trolley 30.

Certain designs contemplated for trolleys 30 may connect and disconnect as in a conventional roller coaster. For example, standoff rods illustrated on the trolleys 30 hereinabove may be connected to provide a train of trolleys at specified distances apart. Meanwhile, trolleys 30 may be connected and disconnected by a suitable automatic or manual connection system.

Since braking force equals a mass times a deceleration, the amount of mass being stopped will depend on rider weight or the number of riders in a train of trolleys 30. Accordingly, in order to equalize braking forces, current plates 83 of ECBS systems 29 may be extended to greater lengths 81a, or additional ECBS current plates 83 may be installed. Also, the actual clearances 81d between current plates 83 and magnets 80 on a particular trolley 30 may be automatically adjusted based on sensing how many riders, how much weight, or the like may be approaching the plates 83.

In certain embodiments, the ECBS 29 may tend to operate to slow each rider alone, even when concatenated together by connecting rods spacing trolleys 30 apart from one another, but holding them together. Since the magnets 80 are on the trolleys 30, with the electrically conductive current plate 83 on the track 12 or fixed with respect to the track 12, the weight carried by each trolley 30 is handled by the magnets 80 on that trolley 30.

Thus, braking need not be adjusted by the number of carts 30 or trolleys 30 in a train. Nevertheless, each rider will simply experience braking according to velocity. However, more trolleys 30 in a train would involve more mass, and therefore less effect or less deceleration occurring due to a set of magnets 80 from a single car passing through the ECBS 29.

However, the next trolley 30 in line would then pass through the current plate 83, followed by another trolley 30 with its magnets 80, thus each acting on the entire train to the extent justified by the speed and passage of the magnets 80 on each individual trolley 30. The end result then is that the train comes to a stop but in a slower rather abrupt fashion.

That is, the braking process occurs over a greater period of time since the magnets 80 are naturally distributed between or among the trolleys 30. Thus, in general, each trolley carries some amount of load, but concatenated trolleys 30 would simply assign the braking force to each trolley 30 in turn as it passed between the current plates 83.

In certain applications, such as a roller coaster, the number of carts 30 or trolleys 30 per train may vary from three to perhaps six or eight as in conventional roller coasters. Of course, this will depend to a certain extent on the loading platform 22 and its spatial provisions. As described hereinabove, brakes will not need to adjust, because each can be set for an individual trolley 30, according to its rider.

To the extent that trolleys 30 may be traveling together, in a train, a standoff or shaft, rigid and sufficiently long to separate trolleys 30 from one another safely, may be connected between adjacent trolleys 30. Preferably, the shaft is connected quite securely, with comparatively small tolerances in order to not permit backlash or "swap" sometimes referred to a slack in the train. Everyone has heard a freight train starting up, as each car in turn has the slack taken up between it and the car ahead of it.

Thus, continuing set of resounding thuds occurs as each car is pulled in turn. Likewise, a train braking creates the same phenomenon as cars use up the slack between themselves and the adjacent cars and slam together. In order to minimize this, a toe shaft or standoff shaft may be fixed or even built into a trolley 30. Accordingly, this provides for an absolute rigid body motion between the shaft and the trolley 30.

Nevertheless, a connection will need to be of modest tolerance, and may have a bumper or elastomeric fitting in order to ease any tolerance in, and permit tightening together. In this way, shafts positioned between trolleys 30 in a train may render the trolleys 30 a train that operates more-or-less as a single unit.

Various apertures discussed hereinabove require pins or bolts to secure them. Each has benefits. In some respects, a bolt tightened down to a suitable torque, and then fitted with a pin, such as a cotter pin or cotter key through a hole crossways through the bolt may provide suitable safety.

The brackets 76 by which the current plate 83 secures to the rail 12 may be formed of a ferrous material. Meanwhile, the current plates 83 themselves needs not be formed of ferrous material. Nevertheless, for strength, weight, or other considerations, some alloy, including a perforated plate 83 may be fabricated of ferrous, non-ferrous, combination, including dielectric materials.

Referring to FIG. 36, equations illustrate the control for adjustment and the number of apertures 99 in the tab 76. The adjustment angle is designated by the Greek letter θ the number of holes 99 or apertures 99 within a tab 76 is designated by the letter n. Meanwhile, the angle θ is the arc 105b. The adjustment angle θ of the tab 76 is the arc 105a or differential angle between adjacent apertures 99 and the tab 76. The θ of the tab 76 is shown for the angle 105a in equation 1 through equation 4.

Thus, there are three significant angles 105. These are the effective adjustment 105c, the differential angle 105a between the adjacent apertures 99 of the tab 76, and the differential angle 105b between adjacent apertures 101 of the panel or frame 74. Equations 1 through 4 demonstrate that the angle 105a needs to be the angle of the adjustment desired multiplied by 'n' (the number of holes 99 in the tab 76) minus 1, all times that adjustment angle 105c.

This is derived from the fact that the θ of the tab 76 divided by the θ of the frame 74 (angle 105a divided by angle 105b should equal one less than the number 'n' of apertures 99 in the tab 76, all divided by that number 'n' of such apertures 99).

Effectively, the incremental angle 105c or θ of adjustment 105c then becomes a simple difference between angle 105b minus angle 105a. Equation 3 shows that the angles 105b in the frame 74 (the panel 74) should be the adjustment angle 105c multiplied by the number 'n' as the number of apertures 99 in the tab 76.

Likewise, control of the spacing of the apertures 101 in the panel 74 or frame 74 and the apertures 99 in the tab 76 are described in equations 1 and 2 as well as equations 5 and 6 illustrated. The numbers for a typical system are illustrated by the values column in the chart of FIG. 36.

Here the number 'n' again represents the number of apertures 99 in the tab 76, while the panel angle 105b is θ of the panel 74 and the tab incremental angle 105a is the θ of the tab 76. The θ of adjustment is the angle 105c. As can be seen by the repetition of equations 1 and 2 that still apply, the available adjustment angle 105c is equivalent to the panel angle 105a less the tab angle 105b. When these equations are reconciled together, the number 'n' of apertures 99 is defined by the panel angle 105a divided by the difference between the panel angle 105a and the tab angle 105b.

In the chart of FIG. 36, equations 1 through 4 are used where arc length is an input. This allows a convenient comparison of fastener size and hole spacing. In contrast, this set of equations including equations 1, 2, 5, and 6 uses an angle as input. This shows that the calculation is considerably less convenient when angle is used for comparison.

These equations 1 through 6 rely on the relationship between the apertures 99 in the panel 74 or the frame 74 and those in the tab 76. The value of 'n' is unitless because it refers to simply a number of apertures. The units of angle are consistent and can represent the arc length or the angle. This is because arc length and angle are related based on the calculation that 360 degrees represent $2\pi$ radians of angle. Angle relates directly to radius and arc length by the equation saying radius times angle in radians equals arc length in unit distance.

Referring to FIG. 37, braking force is defined in terms of equation 7, where 'F' is braking force. In equations 7 through 10, the letter 'p' equals the number of magnets 80. The letter 's' is the conductivity of the current plate 83. Typically, this may be influenced by the percent of copper therein.

The designation of 'd' and particularly 'di' represents the thickness 81c of the current plate 83. The letter 'l' is the length of a single block magnet 80 of the several stacked up together on the base plate 82. The letter '$C_{convert}$' is a conversion value from percent copper to units of electrical conductivity. The letter '$B_r$' is known as a remanence field or residual magnetism given in teslas. This is available from suppliers of magnets 80.

The letter 'D' represents the thickness of an individual magnet 80. Calculated values that vary as part of the design process include 'a' as a geometric constant for a particular magnet 80, including its material properties and so forth. The letter '$B_s$' represents a magnetic flux density. The units of magnetic flux density are typically in gauss and may be determined by repair to any handbook of material properties and electrical or other technician or engineering terminology. The letter 'z' represents an instantaneous distance (clearance 81c) from a face of a magnet 80 to the current plate 83.

Calculated values resulting include the letter '$F_{braking}$' as an instantaneous braking force acting on the magnets 80 and consequently the trolley 30. The letter 'v' represents the instantaneous velocity of the magnets 80 with respect to the current plate 83. The parameter '$c_s$' is a place holder value to simplify the equation display wherein braking force is equal to the number of magnets 80 times this place holder times velocity. Of course, the velocity is relative velocity between the motion of the magnets 80 and the current plate 83.

Thus, equation 7 defines the braking force, while equation 8 defines the place holder value. Meanwhile, equation 9 defines the geometric constant for the magnets 80 in terms of their dimensions defined hereinabove. Accordingly, the magnetic flux density is defined by equation 10.

These calculations begin with an initial velocity calculated, measured, or estimated by a technician or an engineer. This is used in calculating a predicted braking force. That braking force is applied as a constant over a small period of time and integrated over that period of time to determine a new velocity. This process may be repeated (iterated) until a designated time has passed totaling seconds or fractions of a second of a braking event. At this point, the deceleration is continually calculated.

The equations may be executed for multiple designated weights. As it turns out, by incrementing in time differentials of about 3 milliseconds, an integrated braking force and deceleration may be calculated over a period of a second to a few seconds. When the calculations are run at different weights, representing different weights of bodies seated in the harness system 31 or assembly 31 under a trolley 30, the velocity, acceleration, and braking "g forces" experienced by a rider may be calculated.

Initial lifting may be done by a sprocket system driving a drive chain, continuously in a single direction or cycling back and forth. Retrieval may be required from where the drive chain releases the cart 30.

In one embodiment, a drive chain runs through a set of three idler sprockets. The bottom sprocket is fixed in a frame and runs the chain under it. The chain then runs up and over a top idler which idler has an adjustable screw that will lift or lower it. The chain runs up around the top of it and then down around a second bottom fixed idler. Thus, every centimeter of lift on the top idler yields two centimeters of length taken out of the chain. From the bottom idlers, the chain goes out to the motor sprocket, driven by the motor, and thence to another alignment sprocket fixed on the rail 12 of the lift system 24, which establishes the path of a sprocket fixed to the lift unit 32 (trolley 32).

The lift unit 32 may have a little one way toggle 92 (swing arm 92) that serves as a ratchet. It lifts over periodic stops (obstructions) freely, moving forward. It then drops down below the cart 30 denying the cart 30 to back up past it. Similar toggles 92 may be placed on the opposite side of the cart rail 12 about every four feet to act like a ratchet. A small polymeric bumper may be added on that so that the swing arm 92 (toggle 92) doesn't clank metal on metal as the cart moves upward past each one. Damping is done to reduce the impact and sound.

Being able to finish out the ride in the absence of main power may be very important because otherwise there has to be extensive rescue equipment. For example, a man lift or the like would be needed to retrieve a person from the coaster cart. In one example, 4 amps on 220 volts run through a motor controller. However, if a separate gear system is used, it can run on 110 volts with about 3 amps, at considerable savings. A battery can provide power to an inverter and A/C increasing the 12 volts. The effect of this system is if on the lift portion of the ride one has a power failure and the system has people on the lift portion of the ride, the motor will at least have sufficient energy provided from the battery through the inverter to lift those riders onto the completion of the ride because they cannot back up with the toggle safety 92. So, at that point they would be able to finish the coast.

Any time the system is stopped, it does not reset. That is, it does not zero out its memory. Rather, it remembers where it was on the path as far as the lift unit is concerned. Therefore, if for any reason, because of fearful riders or because somebody accidentally hits the stop button, or somebody screams and somebody hits the stop button but nobody knows why, hitting the "on" button or "go" button returns a system to its previous condition. That is, it remembers where it was and simply continues from there rather than requiring any resets.

Variable frequency drive controls the motor going forward. Returning may be included. The motor can be controlled as far as its speed and lifting riders to the sendoff point as well as controlling the speed of the return of the motor unit or drive unit.

The system 10 may have proximity sensors that add inputs for a control algorithm. By having proximity sensors at each end, the motor unit, drive unit, or lift unit, or the like has an absolute sensibility to its position at all times.

In prior art systems, for example, distance may be calculated from a counter. Thus, if a cog slips a tooth, strips, or otherwise loses its count, it has lost its way and is an open loop control. Here, there is always a closed loop control based on absolute position due to proximity sensors.

The motor control also provides control for an acceleration rate of the motor along a gradual course. The rate of acceleration of the motor getting up to drive speed can be controlled as to its rate and the integrated rate over time. It may dictate maximum velocity. Being controlled in both directions, the rider never feels an instantaneous jolt.

In contrast, maximum draw of current, and therefore maximum power results from the motor at zero velocity when it his turned on. Controllers preserve the motor against overloading or excessive current. Ramping it up to speed and decelerating it at some conditional rate limits currents, fluctuations of velocity, and uncontrolled draw of power. Variable frequency drive with digital signal, inputs reduce the number and the duration of the voltage pulses controlled by the variable frequency drive, VFD.

One of the other control mechanisms is to adjust cycle times. For example, the number of seconds a rider spends on the ride needs to be more than the amount of time that it takes to equip another rider, place the rider in the cart, and launch that cart on the lift portion of the ride. Accordingly, the observed cycle time of the cart may be calculated and used as an input in order to control how fast the motor unit or lift unit will return to the loading deck. Thus, a returning rider does not collide with a loading rider.

The lift time and the return time of an individual rider to load up another rider and send them to the top of the ride may be calculated and measured empirically. These times can be evaluated and used for control. Return time, again refers to return time of the rider. There is also a return time of the motor unit or the drive unit. The return time of the drive unit need not be excessively fast if it can be calculated into the return time of the rider. Thus, there is the lift time of a rider, the return time of the rider. The return time of the motor unit must coordinate with the next rider.

The magnet system may be unique in that the magnets 80 have undergone three shifts. First of all, they were changed from electro magnets 80 to permanent magnets 80. This allowed shift number two which means the magnets can be moved from the fixed frame or structure onto the moving trolleys 30. Thus, every trolley 30 is individually braked. Then, each can be tuned by adjustment of the distance 81d of the plate away from the magnets 80 (distance to the third power and velocity to the second power, actually, reciprocal distance to the third power and speed to the second power are proportional to braking force).

By putting the magnets 80 on the cart 30, carts 30 can be "convoyed" or "trained" as a mechanism to link them together as in a conventional roller coaster to travel in trains with each cart will have its own braking. In this way, the brakes may be tuned for the rider to be from about 45 to about 250 pounds and still be adequately braked without undue stress, without too abrupt a braking force, or otherwise inducing any discomfort on the user. Nevertheless, no matter how long the train, every cart 30 may have its own braking sufficient for its own rider.

One of the other influences here is the fact that the current plate 83 for the ECBS 29 may be of any desired length 81a and may be spread in any distance 81d apart. One significance of this is the fact that the plates 83 generate eddy currents and therefore no individual cart 30 picks up the resulting heat. Thus, the duty cycle of the plate 83 is comparatively smaller. Magnets 80 pass by only once every trip as one cycle with one passenger.

An eddy current brake 29 may have a relationship requirement between the length 81a of the current plate 83 and the length of the brake magnet bar 82 and magnets 80 mounted thereon. The magnetic forces have an "edge effect" near their beginning which tends to draw the magnets 80. Here, where the plate is aluminum but it is connected to steel bar, it has an edge effect at the end.

Originally, when the brakes were done with multiple plates at a certain distance the edge effects could then dominate. Thus, it has become preferred to provide a plate that is comparatively long, in this case about five feet (1½ meters). The brake magnets 80 constitute a bar of five magnets 80 about a 1½ inch (4 cm) each for a total of about eight inches (20 cm).

The track 12 or cart rail 12 never need move, and may never need to turn in more than one direction (degree of freedom) at a time. This allows for manufacturing alignment and for manufacturability of all the components. Also, the turntable attachment scheme provides for adjustment in place rather than conventional precision welding. Meanwhile, conventional tube type tracks require precision bending in several degrees of freedom. They are welded in place with struts between them. Here that is not required. The beam is heated to bend it but need only bend either up or down or else right or left at any one location.

A system as described herein may be combined to include a laser-tag-type shooting gallery with targets on outside walls, inside supports, on seats 31 or suspended from carts 30. Likewise, interactive virtual reality (VR) systems, goggles, helmets or accessories may be provided for action rides set in any virtual setting from wild-west, to futuristic types. Trolleys 30 may be motorized with power provided with the rails 12 or other mechanisms (batteries, cables, etc.). Lift systems may be provided with battery back up to clear riders from the ramp portion 26 in the event of a power or motor failure.

Just as the yokes 100 pivot, joints may be added to permit the rider and harness to pivot or even rotate in additional degrees of freedom (e.g., pitch, yaw) below the trolley.

Cycle Time is dependent on the particular installation. One may want to make sure that an operator can't accidentally put people on too fast. For systems of any significant height, the amount of time spent on the lift hill (ramp portion 26) maintains this separation by virtue of just taking time. A variable frequency drive (VFD) for the lift system 24 may be set to return the lift trolley as quickly as is practical.

Separate control systems may be devoted to cycle times. Some riders like a thrilling, comparatively very high point to start. Exact timing may be decided by using a simple sensor and timer. Measurements for heaviest loads and lightest should theoretically be identical, but friction of mechanical mechanisms and air drag alter that theory. A cycle time will be limited by the slowest descent. Ideally, the lift system would be running at all times, and an exiting rider would be reaching the bottom of the lift hill 26 just as the lift trolley returns to the low position.

One embodiment may include a continuous lift system (rather than a reciprocating, "fetch" system). Timing when riders are released onto the track 12 may be limited by a suitable spacing and timing needed for the fastest subsequent rider following behind the slowest leading rider, in order to maintain safety. So a Light Rider Time, less a Heavy Rider Time, plus a loading time or time gap for safety may be the Release Time.

In certain embodiments, the harnesses 31 harness systems 31 may be designed such that patrons (riders) ride side by side. In this way, a single trolley 30 may support the weight of multiple riders simultaneously.

The adjustment mechanism, based on the eccentric axles 72 inside the wheels 70 may permit adjustment of the wheel position also for the purposes of compensating for wear. This will necessarily change somewhat the diameter of a wheel 70 as it wears. It may alter somewhat its elastic (resilience) properties. It may be done to maintain the desired tolerance, any desired tolerance, between the wheels 70 and the track 12.

The present invention may be embodied in other specific forms without departing from its purposes, functions, structures, or operational characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A method comprising:
    providing a course track defining a longitudinal direction, lateral direction, and transverse direction mutually orthogonal to one another at any point along the course track;
    providing a ride trolley fitted to ride on the course track;
    providing a lift track;
    providing a lift trolley, drive motor, and connection strand;
    mounting the ride trolley onto the course track;
    mounting the lift trolley on the lift track;
    engaging the ride trolley by the lift trolley to move both under the influence of the drive motor on the lift trolley through the connection strand;
    suspending a rider from the ride trolley;
    moving the rider through lateral, transverse, and longitudinal translation with the course track and in roll outside the path of the course track about a longitudinal axis; and
    braking the trolley by eddy current braking.

2. The method of claim 1, further comprising providing a magnet secured fixedly to one of the ride trolley and the course track and a current plate spaced away from the magnet on the other of the course track and the trolley.

3. The method of claim 2, further comprising adjusting the eddy current braking by adjusting a clearance between the current plate and the magnet.

4. The method of claim 3, further comprising varying the clearance in a lateral direction with distance along the current plate in a longitudinal direction.

5. The method of claim 4, further comprising dynamically varying the clearance based on speed of a trolley approaching engagement of the magnet with the current plate.

6. The method of claim 5, further comprising providing control of the clearance empirically based on a weight of the trolley against the rail when loaded with a rider.

7. The method of claim 1, further comprising providing a static universal between the rail and a mounting location adjustable in four degrees of freedom.

8. The method of claim 7, wherein the four degrees of freedom include three degrees of freedom in translation and one of rotation.

9. The method of claim 8, wherein the three degrees of freedom in translation are mutually orthogonal.

10. The method of claim 9, wherein two of the degrees of freedom in translation are provided by apertures elongated orthogonally with respect to one another, and the third degree of freedom is adjusted by a fastener through the apertures.

11. The method of claim 1, further comprising damping to control a rate of rotation of a rider in harness with respect to the trolley.

12. A method comprising:
    providing a course track defining a longitudinal direction, lateral direction, and transverse direction mutually orthogonal to one another at any point along the course track;
    providing a ride trolley fitted to ride on the course track;
    providing a lift track;
    providing a lift trolley, drive motor, and connection strand;

mounting the ride trolley onto the course track;
mounting the lift trolley on the lift track;
engaging the ride trolley by the lift trolley to move both under the influence of the drive motor on the lift trolley through the connection strand;
suspending a rider from the ride trolley;
moving the rider through lateral, transverse, and longitudinal translation with the course track and in roll outside the path of the course track about a longitudinal axis; and
braking the trolley by an eddy current braking system, wherein the eddy current braking system comprises a magnet and a current plate interacting between the ride trolley and the track, a clearance between the magnet and current plate being dynamically adjustable based upon characteristics of the rider moving along the track under the trolley approaching the current plate.

13. The method of claim 12, further comprising providing a static universal between the rail and a mounting location adjustable in four degrees of freedom.

14. The method of claim 13, wherein the four degrees of freedom include three degrees of freedom in translation and one of rotation.

15. The method of claim 14, wherein the three degrees of freedom in translation are mutually orthogonal.

16. The method of claim 15, wherein two of the degrees of freedom in translation are provided by apertures elongated orthogonally with respect to one another, and the third degree of freedom is adjusted by a fastener through the apertures.

17. A method comprising:
providing a course track defining a longitudinal direction, lateral direction, and transverse direction mutually orthogonal to one another at any point along the course track;
providing a ride trolley fitted to ride on the course track;
providing a lift track;
providing a lift trolley, drive motor, and connection strand;
providing a static universal between the rail and a mounting location adjustable in four degrees of freedom;
mounting the ride trolley onto the course track;
mounting the lift trolley on the lift track;
engaging the ride trolley by the lift trolley to move both under the influence of the drive motor on the lift trolley through the connection strand;
suspending a rider from the ride trolley;
moving the rider through lateral, transverse, and longitudinal translation with the course track and in roll outside the path of the course track about a longitudinal axis; and
braking the trolley by an eddy current braking system, wherein the eddy current braking system comprises a magnet and a current plate interacting between the ride trolley and the track, a clearance between the magnet and current plate being dynamically adjustable based upon characteristics of the rider moving along the track under the trolley approaching the current plate.

18. The method of claim 17, wherein the four degrees of freedom with the static universal include three degrees of freedom in translation and one of rotation and two of the degrees of freedom in translation are provided by apertures elongated orthogonally with respect to one another, and the third degree of freedom is adjusted by a fastener through the apertures.

19. The method of claim 17, further comprising damping to control a rate of rotation of the rider in harness with respect to the trolley.

* * * * *